United States Patent
Park

(10) Patent No.: US 6,208,383 B1
(45) Date of Patent: Mar. 27, 2001

(54) SOFT SCROLLING METHOD AND APPARATUS OF CLOSED-CAPTION WORDS

(75) Inventor: Hyun-Jeong Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/851,540

(22) Filed: May 5, 1997

(30) Foreign Application Priority Data

May 3, 1996 (KR) .................................................. 96-14440

(51) Int. Cl.⁷ .................................................. H04N 7/086
(52) U.S. Cl. ........................... 348/468; 348/461; 348/473; 348/563; 348/564; 348/723; 348/725
(58) Field of Search .................................... 348/468, 461, 348/476, 473, 477, 478, 479, 563, 564, 723, 725; H04N 7/08, 7/087

(56) References Cited

U.S. PATENT DOCUMENTS

| | | | | |
|---|---|---|---|---|
| 4,303,940 | * | 12/1981 | Ciciora | 358/142 |
| 4,310,854 | * | 1/1982 | Baer | 358/143 |
| 4,958,230 | * | 9/1990 | Jonnalagadda et al. | 358/186 |
| 5,347,365 | * | 9/1994 | Harigai et al. | 348/525 |
| 5,428,400 | * | 6/1995 | Landis et al. | 348/569 |
| 5,477,274 | * | 12/1995 | Akiyoshi et al. | 348/468 |
| 5,483,289 | * | 1/1996 | Urade et al. | 348/468 |
| 5,500,680 | * | 3/1996 | Lee | 348/468 |
| 5,506,626 | * | 4/1996 | Yagi et al. | 348/464 |
| 5,508,754 | * | 4/1996 | Orphan | 348/722 |
| 5,519,443 | * | 5/1996 | Salomon et al. | 348/467 |
| 5,543,851 | * | 8/1996 | Chang | 348/468 |
| 5,572,260 | * | 11/1996 | Onishi et al. | 348/460 |
| 5,659,368 | * | 8/1997 | Landis | 348/467 |
| 5,696,561 | * | 12/1997 | Mizuno | 348/468 |
| 5,708,475 | * | 1/1998 | Hayashi et al. | 348/468 |
| 5,748,251 | * | 5/1998 | Nishimura | 348/468 |
| 5,801,782 | * | 9/1998 | Patterson | 348/473 |
| 5,880,789 | * | 3/1999 | Inaba | 348/564 |
| 5,900,913 | * | 5/1999 | Tults | 348/468 |
| 5,913,009 | * | 6/1999 | Kuboji et al. | 386/68 |

\* cited by examiner

Primary Examiner—John K. Peng
Assistant Examiner—Jean W. Désir
(74) Attorney, Agent, or Firm—Staas & Halsey LLP

(57) ABSTRACT

A soft scrolling method and apparatus of closed-caption words whereby caption information which is encoded in a horizontal line of each field of a television broadcasting signal which does not affect the broadcasting signal is displayed on a display screen of a receiver, as being scrolled line by line by selection of a viewer. According to the method, whether or not the present mode is a soft scroll mode is discriminated, and if so, character data is read out from a display memory, in which decoded caption information is stored, for a line or several lines at predetermined intervals into which a one-row scrolling time is equally divided. The readout character data is converted into a video signal to be displayed on the display screen.

29 Claims, 33 Drawing Sheets

FIG. 5

VALUES OF D12,D11,D10,D9 IN MSWORD

| | 0 | 1 | 2 | 3 | 4 | 5 | 6 | 7 | 8 | 9 | A | B | C | D | E | F | FUNCTION |
|---|---|---|---|---|---|---|---|---|---|---|---|---|---|---|---|---|---|
| 0 | black LTR | RED LTR | MAGENTA LTR | BLUE LTR | CYAN LTR | GREEN LTR | YELLOW LTR | WHITE LTR | BLACK GROUND | TRANSPARENT GROUND | MAGENTA GROUND | BLUE GROUND | CYAN GROUND | GREEN GROUND | YELLOW GROUND | WHITE GROUND | COLOR DESIG. |
| 1 | ATTR. RELEASE | | | UNDERLINE DESIG. | | BLINKG DESIG. | IMAGE DESIG. | | | 2-LINE ROLL-UP (PAGE START) | 3-LINE ROLL UP | | 4-LINE ROLL-UP | | SOFT-SCROLL | 5-LINE ROLL-UP | CHAR. ATTR. & ROLL-UP |
| 2 | ON-DISPLAY | | | OFF-DISPLAY | | HOR. WRIT'G | VER WRIT'G | | | 2-LINE ROLL-DOWN (PAGE END) | 3-LINE ROLL-DOWN | | 4-LINE ROLL-DOWN | | | 5-LINE ROLL-DOWN | DISPLAY METHOD & ROLL-DOWN |
| 3 | APDR | | | APUR | | APF | APB | | | 3LTR APF | 4LTR APF | | 5LTR APF | | | 6LTR APF | POSITION MOVEMENT |
| 4 | 1ST ROW | | | 2ND ROW | | 3RD ROW | 4TH ROW | | | 5TH ROW | 6TH ROW | | 7TH ROW | | | 8TH ROW | ROW & COLUMN POSITION DESIG. |
| 5 | 9TH ROW | | | 10TH ROW | | 1ST COL. | 2ND COL. | | | 3RD COL. | 4TH COL. | | 5TH COL. | | | 6TH COL. | |
| 6 | 7TH ROW | | | 8TH COL. | | 9TH COL. | 10TH COL. | | | 11TH COL. | 12TH COL. | | 13TH COL. | | | 14TH COL. | |
| 7 | 15TH ROW | | | 16TH COL. | | 17TH COL. | 18TH COL. | | | RECEIVE & STORE | HOLD | | HOLD | | | HOLD | |

VALUES OF D3′ D2′ D1 IN LSWORD

FIG.6A

| UPPER | LOWER | CLASSIFICATION |
|---|---|---|
| a1<br>a2 | a0~ff | SPECIAL CHARACTER |
| a3 | 〃 | NUMERAL & ENGLISH CHARACTER |
| a4 | 〃 | HANGUL CHARACTER |
| a5 | 〃 | GREEK |
| a6~a9 | 〃 | SPECIAL CHARACTER |
| aa<br>ab | 〃 | JAPANESE HIRAGANA/KATAKANA |
| ac | 〃 | RUSSIAN |
| ad~af | 〃 | NOT IN USE |
| b0~c9 | 〃 | HANGUL |
| ca~fe | 〃 | CHINESE CHARACTER |
| ff | 〃 | NOT IN USE |

FIG. 6B

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| a1 | a0 |   | ˋ | . | ． | ‥ | … | ¨ | 〃 | ― | ‐ | ∥ | \ | ～ | ´ | ˙ |
|    | b0 | ¨ | ¨ | ( | ) | ⟨ | ⟩ | 《 | 》 | 「 | 」 | 『 | 』 | 【 | 】 | ± | × |
|    | c0 | ÷ | ≠ | ≤ | ≥ | ∞ | ∴ | ° | ′ | ″ | ℃ | Å | ¢ | £ | ¥ | ♂ | ♀ |
|    | d0 | ∠ | ⊥ | ⌒ | ∂ | ∇ | ≡ | ≒ | § | ※ | ☆ | ★ | ○ | ● | ◎ | ◇ | ◆ |
|    | e0 | □ | ■ | △ | ▲ | ▽ | ▼ | → | ← | ↑ | ↓ | ↔ | = | ≪ | ≫ | √ | ∽ |
|    | f0 | ∝ | ∵ | ∫ | ∬ | ∈ | ∋ | ⊆ | ⊇ | ⊂ | ⊃ | ∪ | ∩ | ∧ | ∨ | ¬ |   |
| a2 | a0 |   |   | ⇒ | ⇔ | ∀ | ∃ | ´ | ～ | ˇ | ˘ | ˙ | ˝ | ˛ | ˚ | ˜ | ¸ |
|    | b0 | ː | ƒ | Σ | Π | ¤ | °F | ‰ | ◁ | ◀ | ▷ | ▶ | ♤ | ♠ | ♡ | ♥ | ♧ |
|    | c0 | ♣ | ⊙ | ◈ | ▣ | ◐ | ◑ | ▒ | ▤ | ▥ | ▦ | ▧ | ▨ | ▩ | ♨ | ☏ | ☎ |
|    | d0 | ☜ | ☞ | ¶ | † | ‡ | ↕ | ↗ | ↙ | ↖ | ↘ | ♭ | ♩ | ♪ | ♬ | ㊣ | ㈜ |
|    | e0 | № | ㏇ | ™ | ㏂ | ㏘ | ℡ |   |   |   |   |   |   |   |   |   |   |
|    | f0 |   |   |   |   |   |   |   |   |   |   |   |   |   |   |   |   |
| a3 | a0 |   | ! | " | # | $ | % | & | ' | ( | ) | * | + | , | - | . | / |
|    | b0 | 0 | 1 | 2 | 3 | 4 | 5 | 6 | 7 | 8 | 9 | : | ; | < | = | > | ? |
|    | c0 | @ | A | B | C | D | E | F | G | H | I | J | K | L | M | N | O |
|    | d0 | P | Q | R | S | T | U | V | W | X | Y | Z | [ | ₩ | ] | ^ | _ |
|    | e0 | ` | a | b | c | d | e | f | g | h | i | j | k | l | m | n | o |
|    | f0 | p | q | r | s | t | u | v | w | x | y | z | { | | | } | ‾ |   |
| a4 | a0 |   | ㄱ | ㄲ | ㄳ | ㄴ | ㄵ | ㄶ | ㄷ | ㄸ | ㄹ | ㄺ | ㄻ | ㄼ | ㄽ | ㄾ | ㄿ |
|    | b0 | ㅀ | ㅁ | ㅂ | ㅃ | ㅄ | ㅅ | ㅆ | ㅇ | ㅈ | ㅉ | ㅊ | ㅋ | ㅌ | ㅍ | ㅎ | ㅏ |
|    | c0 | ㅐ | ㅑ | ㅒ | ㅓ | ㅔ | ㅕ | ㅖ | ㅗ | ㅘ | ㅙ | ㅚ | ㅛ | ㅜ | ㅝ | ㅞ | ㅟ |
|    | d0 | ㅠ | ㅡ | ㅢ | ㅣ |   | ㅥ | ㅦ | ㅧ | ㅨ | ㅩ | ㅪ | ㅫ | ㅬ | ㅭ | ㅮ | ㅯ |
|    | e0 | ㅰ | ㅱ | ㅲ | ㅳ | ㅴ | ㅵ | ㅶ | ㅷ | ㅸ | ㅹ | ㅺ | ㅻ | ㅼ | ㅽ | ㅾ | ㅿ |
|    | f0 | ㆀ | ㆁ | ㆂ | ㆃ | ㆄ | ㆅ | ㆆ | ㆇ | ㆈ | ㆉ | ㆊ | ㆋ | · | ㆍ |   |   |
| a5 | a0 |   | i | ii | iii | iv | v | vi | vii | viii | ix | x |   |   |   |   |   |
|    | b0 | I | II | III | IV | V | VI | VII | VIII | IX | X |   |   |   |   |   |   |
|    | c0 |   | A | B | Γ | Δ | E | Z | H | Θ | I | K | Λ | M | N | Ξ | O |
|    | d0 | Π | P | Σ | T | Y | Φ | X | Ψ | Ω |   |   |   |   |   |   |   |
|    | e0 |   | α | β | γ | δ | ε | ζ | η | θ | ι | κ | λ | μ | ν | ξ | ο |
|    | f0 | π | ρ | σ | τ | υ | φ | χ | ψ | ω |   |   |   |   |   |   |   |

FIG. 6C

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| a6 | a0 | ─ | │ | ┌ | ┐ | ┘ | └ | ├ | ┬ | ┤ | ┴ | ┼ | ━ | ┃ | ┏ | ┓ | ┛ |
|  | b0 | ┗ | ┣ | ┳ | ┫ | ┻ | ╋ | ┠ | ┯ | ┨ | ┷ | ┿ | ┝ | ┰ | ┥ | ┸ | ╂ |
|  | c0 | ┼ | ┐ | ┓ | ┒ | ┑ | ┕ | ┖ | ┗ | ┘ | ┕ | ┝ | ┝ | ┝ | ┝ | ┥ | ┥ |
|  | d0 | ┥ | ┯ | ┯ | ┯ | ┯ | ┷ | ┷ | ┷ | ┷ | ┿ | ┿ | ┿ | ┿ | ┿ | ┿ | ┿ |
|  | e0 | ┿ | ┿ | ┿ | ┿ | ┿ |  |  |  |  |  |  |  |  |  |  |  |
|  | f0 |   |   |   |   |   |   |   |   |   |   |   |   |   |   |   |   |
| a7 | a0 |  | μℓ | mℓ | dℓ | ℓ | kℓ | cc | mm² | cm² | m² | km² | fm | nm | μm | mm | cm |
|  | b0 | km | mm³ | cm³ | m³ | km³ | ha | μg | mg | kg | kt | cal | kcal | dB | m/s | m/s² | ps |
|  | c0 | ns | μs | ms | pV | nV | μV | mV | kV | MV | pA | nA | μA | mA | kA | pW | nW |
|  | d0 | μW | mW | kW | MW | Hz | kHz | MHz | GHz | THz | Ω | kΩ | MΩ | pF | nF | μF | mol |
|  | e0 | cd | rad | m/s | m/s² | sr | Pa | kPa | MPa | GPa | Wb | lm | lx | Bq | Gy | Sv | %₀ |
|  | f0 |  |  |  |  |  |  |  |  |  |  |  |  |  |  |  |  |
| a8 | a0 |  | Æ | Ð | ª | Ħ |  | IJ |  | Ŀ | Ł | Ø | Œ | º | Þ | Ŧ | ŋ |
|  | b0 | ① | ② | ③ | ④ | ⑤ | ⑥ | ⑦ | ⑧ | ⑨ | ⑩ | ⑪ | ⑫ | ⑬ | ⑭ | ⑮ | ㉠ |
|  | c0 | ㉡ | ㉢ | ㉣ | ㉤ | ㉥ | ㉦ | ㉧ | ㉨ | ㉩ | ㉪ | ㉫ | ㉬ | ⓐ | ⓑ | ⓒ |  |
|  | d0 | ⓓ | ⓔ | ⓕ | ⓖ | ⓗ | ⓘ | ⓙ | ⓚ | ⓛ | ⓜ | ⓝ | ⓞ | ⓟ | ⓠ | ⓡ | ⓢ |
|  | e0 | ⓣ | ⓤ | ⓥ | ⓦ | ⓧ | ⓨ | ⓩ | ① | ② | ③ | ④ | ⑤ | ⑥ | ⑦ | ⑧ | ⑨ |
|  | f0 | ⑩ | ⑪ | ⑫ | ⑬ | ⑭ | ⑮ | 1/2 | 1/3 | 2/3 | 1/4 | 3/4 | 1/8 | 3/8 | 5/8 | 7/8 |  |
| a9 | a0 |  | æ | đ | ð | ħ | ı | ij | ĸ | ŀ | ł | ø | œ | β | þ | ŧ | ŋ |
|  | b0 | n | ㈀ | ㈁ | ㈂ | ㈃ | ㈄ | ㈅ | ㈆ | ㈇ | ㈈ | ㈉ | ㈊ | ㈋ | ㈌ | ㈍ | ㈎ |
|  | c0 | ㈏ | ㈐ | ㈑ | ㈒ | ㈓ | ㈔ | ㈕ | ㈖ | ㈗ | ㈘ | ㈙ | ㈚ | (a) | (b) | (c) |  |
|  | d0 | (d) | (e) | (f) | (g) | (h) | (i) | (j) | (k) | (l) | (m) | (n) | (o) | (p) | (q) | (r) | (s) |
|  | e0 | (t) | (u) | (v) | (w) | (x) | (y) | (z) | (1) | (2) | (3) | (4) | (5) | (6) | (7) | (8) | (9) |
|  | f0 | (10) | (11) | (12) | (13) | (14) | (15) | 1 | 2 | 3 | 4 | n | 1 | 2 | 3 | 4 |  |
| aa | a0 |  | あ | ぁ | い | ぃ | う | ぅ | え | ぇ | お | ぉ | か | が | き | ぎ | く |
|  | b0 | ぐ | け | げ | こ | ご | さ | ざ | し | じ | す | ず | せ | ぜ | そ | ぞ | た |
|  | c0 | だ | ち | ぢ | っ | つ | づ | て | で | と | ど | な | に | ぬ | ね | の | は |
|  | d0 | ば | ぱ | ひ | び | ぴ | ふ | ぶ | ぷ | へ | べ | ぺ | ほ | ぼ | ぽ | ま | み |
|  | e0 | む | め | も | ゃ | や | ゅ | ゆ | ょ | よ | ら | り | る | れ | ろ | ゎ | わ |
|  | f0 | ゐ | ゑ | を | ん |  |  |  |  |  |  |  |  |  |  |  |  |

FIG. 6D

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| ab | a0 |   | ァ | ア | ィ | イ | ゥ | ウ | ェ | エ | ォ | オ | カ | ガ | キ | ギ | ク |
|    | b0 | グ | ケ | ゲ | コ | ゴ | サ | ザ | シ | ジ | ス | ズ | セ | ゼ | ソ | ゾ | タ |
|    | c0 | ダ | チ | ヂ | ッ | ツ | ヅ | テ | デ | ト | ド | ナ | ニ | ヌ | ネ | ノ | ハ |
|    | d0 | バ | パ | ヒ | ビ | ピ | フ | ブ | プ | ヘ | ベ | ペ | ホ | ボ | ポ | マ | ミ |
|    | e0 | ム | メ | モ | ヤ | ャ | ユ | ュ | ヨ | ョ | ラ | リ | ル | レ | ロ | ワ | ヲ |
|    | f0 | ヰ | ヱ | ヲ | ン | ヴ | カ | ケ |   |   |   |   |   |   |   |   |   |
| ac | a0 |   | А | Б | В | Г | Д | Е | Ё | Ж | З | И | Й | К | Л | М | Н |
|    | b0 | О | П | Р | С | Т | У | Ф | Х | Ц | Ч | Ш | Щ | Ъ | Ы | Ь | Э |
|    | c0 | Ю | Я |   |   |   |   |   |   |   |   |   |   |   |   |   |   |
|    | d0 |   | а | б | в | г | д | е | ё | ж | з | и | й | к | л | м | н |
|    | e0 | о | п | р | с | т | у | ф | х | ц | ч | ш | щ | ъ | ы | ь | э |
|    | f0 | ю | я |   |   |   |   |   |   |   |   |   |   |   |   |   |   |
| ad | a0–f0 | NOT IN USE |||||||||||||||| 
| ae | a0–f0 | NOT IN USE |||||||||||||||| 
| af | a0–f0 | NOT IN USE ||||||||||||||||

FIG. 6E

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| b0 | a0<br>b0<br>c0<br>d0<br>e0<br>f0 | 가<br>갇<br>갓<br>것<br>견<br>곤 | 각<br>갈<br>강<br>겉<br>결<br>골 | 간<br>갉<br>개<br>겊<br>겸<br>곰 | 갇<br>갊<br>갠<br>겋<br>겹<br>곱 | 갈<br>감<br>갤<br>게<br>겻<br>곬 | 갉<br>갑<br>거<br>겐<br>경<br>곯 | 갊<br>값<br>걱<br>겔<br>곁<br>곰 | 감<br>갓<br>건<br>겜<br>계<br>곱 | 갑<br>갔<br>걷<br>겝<br>곅<br>곳 | 값<br>강<br>걸<br>겟<br>곈<br>공 | 갓<br>갖<br>걺<br>겠<br>곌<br>곶 | 갔<br>같<br>검<br>겡<br>곕<br>과 | 강<br>갚<br>겁<br>겨<br>곗<br>곽 | 갖<br>갛<br>것<br>격<br>고<br>관 | 갗<br>개<br>겄<br>겪<br>곡<br>괄 | 같<br>객<br>경<br>견<br>곤<br>괆 |
| b1 | a0<br>b0<br>c0<br>d0<br>e0<br>f0 | 괌<br>굅<br>굄<br>궐<br>궁<br>짜 | 괍<br>굇<br>굅<br>궘<br>귀<br>깐 | 괏<br>굉<br>굿<br>궜<br>기<br>깔 | 광<br>교<br>궁<br>궝<br>긱<br>깖 | 괘<br>굔<br>궂<br>궤<br>긴<br>깜 | 괜<br>굘<br>궃<br>궷<br>긷<br>깝 | 괠<br>굡<br>궄<br>귀<br>길<br>깟 | 괩<br>굣<br>궈<br>귁<br>깁<br>깠 | 괬<br>구<br>궉<br>귄<br>김<br>깡 | 괭<br>국<br>권<br>귈<br>깃<br>깥 | 괴<br>군<br>궐<br>귐<br>깅<br>깨 | 괵<br>굳<br>궜<br>귑<br>깆<br>깩 | 괸<br>굴<br>궝<br>귓<br>깊<br>깬 | 괼<br>굵<br>궤<br>규<br>까<br>깰 | 굄<br>굶<br>궷<br>균<br>깍<br>깸 | 굅<br>굻<br>귀<br>귤<br>깎<br>깻 |
| b2 | a0<br>b0<br>c0<br>d0<br>e0<br>f0 | 깼<br>꼈<br>꼭<br>꽥<br>꿋<br>낄 | 깽<br>꼍<br>꼰<br>꽹<br>꿍<br>낌 | 꺄<br>꼐<br>꼲<br>꾀<br>꽂<br>낍 | 꺅<br>꼬<br>꼴<br>꾄<br>꽉<br>뀨 | 꺆<br>꼭<br>꼼<br>꾈<br>뀌<br>끄 | 꺠<br>꼰<br>꼽<br>꾐<br>뀐<br>끅 | 꺼<br>꼲<br>꼿<br>꾑<br>뀔<br>끈 | 꺽<br>꼴<br>꽁<br>꾕<br>뀜<br>끊 | 꺾<br>꼼<br>꽂<br>꾜<br>뀝<br>끌 | 껀<br>꼽<br>꽃<br>꾸<br>뀟<br>끎 | 껄<br>꼿<br>꽄<br>꾹<br>뀨<br>끓 | 껌<br>꽁<br>꽈<br>꾼<br>끄<br>끔 | 껍<br>꽂<br>꽉<br>꿀<br>끅<br>끕 | 껏<br>꽃<br>꽐<br>꿇<br>끈<br>끗 | 껐<br>꽄<br>꽜<br>꿈<br>끊<br>끙 | 껑<br>꽝<br>꽤<br>꿉<br>끌<br>끝 |
| b3 | a0<br>b0<br>c0<br>d0<br>e0<br>f0 | 끝<br>남<br>냅<br>넓<br>녀<br>놈 | 끼<br>납<br>냇<br>넘<br>녁<br>놉 | 끽<br>낫<br>냈<br>넙<br>년<br>놋 | 낀<br>났<br>냉<br>넛<br>녈<br>농 | 낄<br>낭<br>냐<br>넜<br>념<br>높 | 낌<br>낮<br>냑<br>넝<br>녑<br>놓 | 낍<br>낯<br>냔<br>넣<br>녔<br>놔 | 낏<br>낱<br>냘<br>네<br>녕<br>놘 | 낑<br>낳<br>냠<br>넥<br>녘<br>놨 | 나<br>내<br>냥<br>넨<br>녜<br>뇌 | 낙<br>낵<br>너<br>넬<br>녠<br>뇐 | 낚<br>낸<br>넉<br>넴<br>노<br>뇔 | 낟<br>낼<br>넋<br>넵<br>녹<br>뇜 | 난<br>냄<br>넌<br>넷<br>논<br>뇝 | 낟<br>냅<br>널<br>넸<br>놀<br>뇟 | 날<br>냇<br>넒<br>넹<br>놂<br>뇨 |
| b4 | a0<br>b0<br>c0<br>d0<br>e0<br>f0 | 놋<br>눗<br>느<br>닉<br>닭<br>답 | 농<br>눙<br>늑<br>닌<br>닮<br>닷 | 높<br>눠<br>는<br>닐<br>닯<br>댔 | 놓<br>눴<br>늘<br>닒<br>닳<br>당 | 놔<br>눼<br>늙<br>님<br>담<br>댸 | 놘<br>뉘<br>늚<br>닙<br>답<br>더 | 놜<br>뉜<br>늠<br>닛<br>닷<br>덕 | 놨<br>뉠<br>늡<br>닝<br>닸<br>덖 | 뇌<br>뉨<br>늣<br>닞<br>당<br>던 | 뇐<br>뉩<br>능<br>다<br>닺<br>덛 | 뇔<br>뉴<br>늦<br>닥<br>닻<br>덜 | 뇜<br>뉵<br>늪<br>닦<br>닿<br>덞 | 뇝<br>뉼<br>늬<br>단<br>대<br>덟 | 뇟<br>늄<br>늰<br>닫<br>댁<br>덤 | 뇨<br>늅<br>닁<br>달<br>댄<br>덥 | 뇩<br>늆<br>니<br>닭<br>댈<br>덧 |

FIG. 6F

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| b5 | a0<br>b0<br>c0<br>d0<br>e0<br>f0 | 덜<br>돗<br>둔<br>듀<br>디 | 덧<br>됬<br>둘<br>듄 | 덩<br>둏<br>둠<br>듈<br>딕 | 덫<br>돠<br>둡<br>듐<br>딘 | 덮<br>돤<br>둣<br>듕<br>딛 | 데<br>돨<br>둥<br>드<br>딜 | 덱<br>돼<br>둬<br>득<br>딤 | 덴<br>됐<br>뒀<br>든<br>딥 | 델<br>되<br>뒈<br>듣<br>딧 | 뎀<br>된<br>뒙<br>들<br>딨 | 뎁<br>될<br>뒝<br>듥<br>딩 | 뎃<br>됨<br>뒤<br>듬<br>딪 | 뎄<br>됩<br>뒨<br>듭<br>딱 | 뎅<br>됫<br>뒬<br>듯<br>딴 | 뎌<br>됴<br>뒵<br>듰 | 뎐<br>두<br>뒷<br>등<br>딸 |
| b6 | a0<br>b0<br>c0<br>d0<br>e0<br>f0 | 떠<br>뗌<br>된<br>똑<br>떱 | 떡<br>뗍<br>뚜<br>뜬<br>뗏 | 떤<br>뗏<br>뚝<br>뜯<br>띵 | 떨<br>뗐<br>뚠<br>뜰<br>라 | 떪<br>뗑<br>뚤<br>뜸<br>락 | 떰<br>뗘<br>뚫<br>뜹<br>란 | 떱<br>뗴<br>뚬<br>뜻<br>랄 | 떳<br>또<br>뚱<br>띄<br>람 | 떴<br>똑<br>뛔<br>띈<br>랍 | 떵<br>똔<br>뛰<br>띌<br>랏 | 떻<br>똘<br>뛴<br>띔<br>랐 | 떼<br>똥<br>뛸<br>띕<br>랑 | 떽<br>똬<br>뜀<br>띠<br>랒 | 뗀<br>똴<br>뜁<br>띤<br>랗 | 뗄<br>뙈<br>띄<br>띨<br>래 | 뗌<br>뙤<br>뜨<br>띰<br>랙 |
| b7 | a0<br>b0<br>c0<br>d0<br>e0<br>f0 | 럭<br>렝<br>론<br>룅<br>뤘 | 래<br>런<br>러<br>롤<br>뤠 | 랙<br>럴<br>럭<br>롬<br>뤼 | 랜<br>럼<br>련<br>롭<br>륀 | 랠<br>렁<br>렵<br>룟<br>륄 | 램<br>럿<br>렴<br>롱<br>륌 | 랩<br>렸<br>렵<br>롯<br>륏 | 랫<br>령<br>롯<br>룡<br>륑 | 랬<br>렷<br>룔<br>룩<br>류 | 랭<br>령<br>룡<br>룽<br>륙 | 랴<br>례<br>롸<br>룬<br>륜 | 략<br>렌<br>뢴<br>룸 | 랸<br>렐<br>룔<br>룹 | 랏<br>렘<br>룀<br>룻 | 량<br>렙<br>룁<br>룽<br>륨 | 러<br>렛<br>록<br>룟<br>륩 |
| b8 | a0<br>b0<br>c0<br>d0<br>e0<br>f0 | 린<br>맛<br>막<br>멘<br>모 | 룻<br>릴<br>망<br>맡<br>멤 | 룽<br>림<br>맞<br>맣<br>멥 | 르<br>립<br>맵<br>머<br>멧 | 룩<br>릿<br>많<br>먹<br>멩 | 른<br>링<br>맡<br>먼<br>몰 | 를<br>마<br>매<br>멀<br>몸 | 름<br>막<br>맨<br>멈<br>몹 | 릅<br>막<br>멥<br>멍<br>못 | 릇<br>만<br>멀<br>멀<br>몽 | 릉<br>맏<br>맵<br>먹<br>면 | 릊<br>많<br>멋<br>메<br>완 | 룽<br>맵<br>멋<br>몇 | 룻<br>맛<br>멍<br>몇<br>왕 | 리<br>맘<br>매<br>메<br>외 | 릭<br>맙<br>먀<br>메 |
| b9 | a0<br>b0<br>c0<br>d0<br>e0<br>f0 | 물<br>뭔<br>밀<br>밖<br>뱅 | 완<br>묽<br>뮐<br>몵<br>뱉 | 뵐<br>뭄<br>뮴<br>밥<br>뱌 | 뵙<br>뭅<br>뮨<br>밥<br>박 | 뵀<br>뭇<br>뮵<br>밤<br>뱐 | 묏<br>뭉<br>뮷<br>밧<br>뱝 | 묑<br>뭍<br>믑<br>밫<br>버 | 묘<br>뭏<br>믕<br>밯<br>벅 | 묜<br>무<br>믐<br>및<br>번 | 묠<br>묵<br>믓<br>밭<br>벌 | 묨<br>뭔<br>밀<br>배<br>벋 | 묭<br>묻<br>믈<br>백<br>범 | 뫼<br>물<br>미<br>밴<br>법 | 묵<br>뭐<br>민<br>뱀<br>벗 | 묻<br>뭣<br>반<br>밸<br>벙 | 뭉<br>뮈<br>밥<br>뱃<br>벚 |

FIG. 6G

| UPPER | LOWER | 0 | 1 | 2 | 3 | 4 | 5 | 6 | 7 | 8 | 9 |
|---|---|---|---|---|---|---|---|---|---|---|---|
| ba | a0<br>b0<br>c0<br>d0<br>e0<br>f0 | 분<br>별<br>봉<br>분<br>븍<br>붓 | 붓<br>볍<br>봐<br>붇<br>빈<br>비 | 북<br>볏<br>볐<br>붉<br>빌<br>빅 | 벼<br>볐<br>봤<br>봄<br>뷰<br>빈 | 법<br>병<br>봬<br>봄<br>뷰<br>빔 | 벤<br>볕<br>봤<br>봄<br>분<br>빕 | 벨<br>벤<br>뵈<br>붑<br>불<br>빔 | 벰<br>보<br>복<br>봇<br>붐<br>빕 | 법<br>복<br>보<br>붕<br>봄<br>빗 | 벗<br>뷰<br>붐<br>붓<br>빙<br>빗 | 뱄<br>볒<br>볐<br>붕<br>브<br>빛 | 병<br>보<br>봐<br>빼<br>블<br>빠 | 벽<br>봄<br>부<br>빼<br>빰<br>빤 | 볏<br>봄<br>뷔<br>뱀<br>뱁<br>빤 | 법<br>봐<br>뱁<br>뱀<br>삼 |
| bb | a0<br>b0<br>c0<br>d0<br>e0<br>f0 | 뺐<br>뻐<br>뽁<br>뽕<br>뺵<br>삽 | 빨<br>뻥<br>뺄<br>뿌<br>뻔<br>삿 | 뺨<br>빼<br>뻠<br>뿍<br>뻴<br>쌓 | 뺌<br>빡<br>뻥<br>뿐<br>쁨<br>상 | 뺑<br>뺌<br>뻣<br>뿔<br>뻡<br>살 | 뺏<br>뺏<br>빴<br>뼘<br>뻣<br>살 | 뻤<br>빵<br>뻤<br>뽁<br>뻣<br>색 | 뻔<br>뻔<br>뻥<br>볶<br>뺑<br>새 | 뽈<br>뽀<br>봉<br>뷔<br>사<br>샌 | 뻣<br>볼<br>봉<br>뽀<br>삭<br>샐 | 뻘<br>뻘<br>뽐<br>뽐<br>산<br>샛 | 뺌<br>뻠<br>뽕<br>빰<br>샅<br>샜 | 뻬<br>뻬<br>뽕<br>봄<br>살<br>생 | 뽀<br>뻘<br>뺌<br>뺌<br>삶<br>샤 | 뼈<br>삽<br>뻠<br>삼<br>샤 |
| bc | a0<br>b0<br>c0<br>d0<br>e0<br>f0 | 션<br>셈<br>셸<br>손 | 약<br>선<br>셉<br>솔 | 산<br>설<br>셋<br>소 | 살<br>섶<br>썼<br>쇄 | 삶<br>섰<br>송<br>솜 | 삼<br>섬<br>속<br>숀 | 샴<br>섭<br>쇠<br>숀 | 샷<br>셔<br>슈<br>숀 | 상<br>선<br>손<br>쉄 | 새<br>섯<br>쇳<br>숏 | 샌<br>셤<br>쇠<br>쑤 | 셀<br>섬<br>숨<br>숙 | 샘<br>셨<br>숨<br>순 | 생<br>섶<br>숄<br>술 | 샀<br>숯<br>술<br>숨 | 샘<br>송<br>술<br>숨 | 서<br>세<br>솟<br>숙 | 석<br>섹<br>세<br>쇼 | 셋<br>센<br>싹<br>숭 | 섹<br>센<br>숙 |
| bd | a0<br>b0<br>c0<br>d0<br>e0<br>f0 | 섭<br>습<br>쌌<br>쌍<br>쏜 | 숯<br>심<br>슷<br>쌀<br>쏟 | 숱<br>심<br>승<br>썰<br>쏠 | 숲<br>싱<br>시<br>썹<br>쏚 | 쉬<br>슈<br>쌈<br>썰<br>쏨 | 쉬<br>슈<br>식<br>쌉<br>쑹 | 쉐<br>슉<br>신<br>썹<br>쏭 | 쉭<br>슬<br>쌌<br>썸<br>솨 | 센<br>슷<br>쌍<br>썸<br>쏴 | 쉴<br>실<br>쌍<br>썹<br>쏸 | 쉽<br>슬<br>심<br>썼<br>쒀 | 스<br>십<br>썩<br>썽<br>쏴 | 싱<br>싯<br>쌘<br>쎄 | 쉬<br>싱<br>셴<br>쎄 | 쉰<br>슾<br>쎌<br>쎗 | 쉴<br>쉴<br>쌤<br>쎈<br>쐬 | 쉼<br>싫<br>쌤<br>쎈<br>쐬 | 쉽<br>쌨<br>쌤<br>쎐<br>쐬 | 싀<br>쌍<br>쇄<br>쌓 | 쏙<br>씬 |
| be | a0<br>b0<br>c0<br>d0<br>e0<br>f0 | 쏀<br>씬<br>씩<br>압<br>약 | 쑹<br>씰<br>씨<br>앗<br>얀 | 쓰<br>씸<br>씸<br>왔<br>얹 | 쏙<br>쏙<br>씹<br>싶<br>얀 | 쓴<br>쓴<br>섶<br>앙<br>얼 | 쑈<br>쏘<br>씽<br>앞<br>얽 | 쑤<br>쑨<br>아<br>앎<br>얽 | 숙<br>씽<br>애<br>앞<br>엄 | 순<br>씨<br>액<br>앞<br>엄 | 숱<br>아<br>양<br>앱<br>업 | 쑴<br>안<br>액<br>없<br>없 | 쑴<br>앤<br>양<br>얇<br>엇 | 쏭<br>앨<br>엠<br>앳<br>었 | 쑴<br>씌<br>알<br>앳<br>엉 | 쒜<br>씬<br>알<br>앴<br>엇 | 쎄<br>씰<br>알<br>얠<br>엊 | 쉬<br>씸<br>았<br>얩<br>엌 | 씨<br>씨<br>앎<br>앰<br>얶 | 압<br>야<br>앵<br>어<br>엎 | 야<br>억<br>앺<br>엎 |

FIG. 6H

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| bf | a0<br>b0<br>c0<br>d0<br>e0<br>f0 | 염<br>오<br>왈<br>윔<br>읅 | 에<br>엽<br>옥<br>왐<br>윕<br>읆 | 엑<br>없<br>온<br>왑<br>윗<br>음 | 엔<br>엿<br>올<br>왓<br>읭 | 엘<br>였<br>옭<br>왕<br>요 | 엠<br>영<br>옴<br>왜<br>용 | 엡<br>옅<br>옵<br>왠<br>워 | 엣<br>옆<br>옰<br>왯<br>웍 | 엥<br>영<br>옷<br>왱<br>워 | 여<br>예<br>옹<br>왼<br>원 | 역<br>옌<br>옻<br>완<br>월 | 역<br>열<br>와<br>왐<br>웜 | 연<br>엽<br>왁<br>왓<br>웝 | 열<br>엿<br>완<br>외<br>웟 | 엶<br>엾<br>왈<br>운<br>웠 | 엷<br>였<br>완<br>울<br>웨 |
| c0 | a0<br>b0<br>c0<br>d0<br>e0<br>f0 | 육<br>웅<br>읽<br>잠<br>자 | 웨<br>윤<br>읊<br>잠<br>작 | 웬<br>율<br>읋<br>잡<br>잔 | 웰<br>윷<br>잃<br>잣<br>잖 | 웸<br>융<br>임<br>잤<br>잘 | 웹<br>윱<br>입<br>장<br>잠 | 윙<br>옷<br>잇<br>쟁<br>잠 | 위<br>윳<br>있<br>찾<br>장 | 윅<br>의<br>잉<br>재<br>잽 | 원<br>으<br>잎<br>잭<br>잼 | 원<br>인<br>자<br>잰<br>저 | 윔<br>이<br>잗<br>잘<br>젖 | 입<br>잇<br>잗<br>잼<br>젓 | 윗<br>잎<br>익<br>잠<br>절 | 윙<br>음<br>잔<br>잖<br>젖 | 유<br>웃<br>일<br>잘<br>쟁 |
| c1 | a0<br>b0<br>c0<br>d0<br>e0<br>f0 | 젙<br>젙<br>젓<br>죠<br>즈 | 젙<br>좀<br>접<br>정<br>즘 | 접<br>종<br>접<br>좌<br>쥐<br>즙 | 젓<br>좋<br>정<br>쪽<br>줍 | 정<br>좌<br>족<br>준<br>즉 | 젖<br>잡<br>중<br>걷<br>중 | 제<br>찾<br>주<br>집<br>짐 | 젝<br>좌<br>죽<br>짐<br>직 | 젠<br>좨<br>준<br>집<br>진 | 젤<br>줄<br>쥐<br>짖<br>짐 | 젬<br>줌<br>쥘<br>즐<br>질 | 잽<br>줌<br>중<br>지 | 잣<br>중<br>죄<br>즘<br>집 | 쟁<br>줄<br>쥔<br>즙<br>집 | 져<br>종<br>줏<br>짓<br>짓 | 전<br>좃<br>집<br>중<br>즉 |
| c2 | a0<br>b0<br>c0<br>d0<br>e0<br>f0 | 재<br>젖<br>쫑<br>쭌<br>찐 | 징<br>짝<br>잡<br>쫓<br>줄<br>질 | 짓<br>짼<br>잣<br>쫘<br>줌<br>짐 | 질<br>쩰<br>짓<br>쩠<br>짬<br>짐 | 짊<br>쩸<br>잤<br>쩌<br>줏<br>집 | 짐<br>정<br>재<br>쫘<br>중<br>징 | 자<br>잡<br>제<br>쫬<br>째<br>짓 | 자<br>잣<br>잽<br>쪄<br>쪠<br>쩟 | 장<br>잤<br>쪘<br>쪼<br>쪄<br>쩡 | 잘<br>쨍<br>젚<br>쬔<br>쪽 | 짤<br>짜<br>쩐<br>쮸<br>찬 | 짧<br>짬<br>쭌<br>쯔<br>참 | 잡<br>짭<br>쭝<br>쯤<br>찰 | 잣<br>잩<br>쫌<br>쯥<br>잣 | 짰<br>짹<br>쭘<br>쭝<br>찻 | 장<br>짱<br>쪽<br>주<br>지 |
| c3 | a0<br>b0<br>c0<br>d0<br>e0<br>f0 | 찰<br>쳄<br>촛<br>축 | 찼<br>참<br>첩<br>총<br>춘 | 창<br>창<br>쳇<br>출<br>창 | 찾<br>처<br>처<br>촤<br>출 | 채<br>척<br>쳐<br>참<br>춥 | 챈<br>천<br>천<br>촙<br>춥 | 챌<br>철<br>쳤<br>창<br>충 | 챔<br>첨<br>처<br>최<br>츳 | 챕<br>첩<br>천<br>충<br>측 | 찻<br>첫<br>청<br>췬<br>츤 | 쨌<br>첬<br>찾<br>취<br>출 | 챙<br>청<br>초<br>친<br>촘 | 차<br>축<br>촉<br>킬<br>춤 | 차<br>책<br>촌<br>칠<br>춥 | 챔<br>첸<br>촘<br>촙<br>충 | 참<br>쳄<br>추<br>칩 |

FIG. 6I

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| c4 | a0<br>b0<br>c0<br>d0<br>e0<br>f0 | <br>캅<br>컥<br>켕<br>콧<br>쿨 | <br>캇<br>컨<br>켜<br>콩<br>쿰 | <br>캉<br>컫<br>켠<br>과<br>쿱 | 치<br>캐<br>컬<br>켤<br>콰<br>쿳 | 칙<br>캑<br>컴<br>켬<br>콱<br>쿵 | 친<br>캔<br>컵<br>켭<br>콴<br>쿼 | 칟<br>캘<br>컷<br>켯<br>콸<br>퀀 | 칠<br>캠<br>컸<br>켰<br>쾀<br>퀄 | 칡<br>캡<br>컹<br>켱<br>쾅<br>퀑 | 침<br>캣<br>케<br>켸<br>쾌<br>쾌 | 칩<br>캤<br>켁<br>코<br>쾡<br>쾡 | 칫<br>캥<br>켄<br>콕<br>쾨<br>퀘 | 칭<br>캬<br>켈<br>콘<br>쾰<br>퀘 | 카<br>캭<br>켐<br>콜<br>쿄<br>퀵 | 칵<br>캉<br>켑<br>콤<br>쿠<br>퀸 | 칸<br>캐<br>켓<br>콥<br>쿡<br>퀼 | 칼<br>커<br>켕<br>콩<br>쿤<br>퀼 |
| c5 | a0<br>b0<br>c0<br>d0<br>e0<br>f0 | <br>키<br>탔<br>털<br>턴<br>퇴 | <br>킥<br>탕<br>툃<br>텼<br>퇸 | <br>킨<br>태<br>텀<br>데<br>툇 | <br>킬<br>택<br>텁<br>텐<br>퉁 | 큅<br>킴<br>탠<br>텃<br>토<br>툐 | 큅<br>킵<br>탤<br>텄<br>톡<br>투 | 킷<br>킷<br>탬<br>텅<br>톤<br>툭 | 킹<br>킹<br>탭<br>테<br>톨<br>툰 | 큐<br>타<br>탯<br>텍<br>톰<br>툴 | 큔<br>탁<br>탰<br>텐<br>톱<br>퉁 | 쿨<br>탄<br>탱<br>텔<br>톳<br>통 | 콤<br>탈<br>탸<br>템<br>통<br>퉅 | 크<br>탉<br>탕<br>텝<br>톳<br>통 | 큭<br>탐<br>터<br>텟<br>퇴<br>퇴 | 큰<br>탑<br>턱<br>텡<br>퇀<br>튀 | 클<br>탓<br>턴<br>텨<br>퇘<br>퇬 |
| c6 | a0<br>b0<br>c0<br>d0<br>e0<br>f0 | <br>튼<br>팀<br>패<br>텁<br>툽 | <br>틀<br>팁<br>팩<br>펏<br>툤 | <br>틀<br>팃<br>팬<br>펐<br>평 | <br>툠<br>팅<br>펄<br>펑<br>폐 | 퉤<br>틈<br>파<br>팸<br>페<br>펠 | 튀<br>틘<br>팍<br>펩<br>펙<br>펩 | 퇵<br>툽<br>팎<br>팟<br>펜<br>펫 | 튄<br>톳<br>팟<br>펫<br>펠<br>포 | 틸<br>팈<br>팠<br>펨<br>펨<br>폭 | 팀<br>틴<br>팽<br>펨<br>펨<br>폰 | 팁<br>팀<br>팜<br>파<br>펩<br>폴 | 퉁<br>톱<br>팜<br>팝<br>펩<br>폼 | 튜<br>팁<br>팝<br>팟<br>팽<br>폭 | 튤<br>티<br>팟<br>팍<br>펴<br>폴 | 튐<br>틱<br>팡<br>팩<br>편<br>풍 | 톡<br>틸<br>팥<br>펌<br>펼<br>폄 |
| c7 | a0<br>b0<br>c0<br>d0<br>e0<br>f0 | <br>품<br>품<br>학<br>행<br>햄 | <br>퐈<br>폽<br>프<br>한<br>하<br>햅 | <br>광<br>풍<br>픈<br>할<br>향<br>햇 | <br>푀<br>풀<br>픔<br>핥<br>허<br>행 | 푄<br>표<br>픕<br>함<br>허<br>허 | 퀀<br>팽<br>픗<br>합<br>헉<br>혁 | 푄<br>풔<br>핏<br>핫<br>헌<br>현 | 품<br>퓌<br>피<br>항<br>혐<br>혈 | 풀<br>핀<br>해<br>헙<br>혐 | 퓸<br>필<br>픽<br>핵<br>험<br>협 | 푼<br>핌<br>판<br>헨<br>헙<br>헛 | 푸<br>퓟<br>핀<br>헨<br>햄<br>혔 | 퓨<br>핌<br>핸<br>헹<br>형 | 푼<br>풋<br>핍<br>핸<br>헤<br>혜 | 폰<br>풀<br>핏<br>햅<br>혜<br>혜 | 풀<br>퓽<br>햅<br>혁<br>혁<br>혠 |
| c8 | a0<br>b0<br>c0<br>d0<br>e0<br>f0 | <br>활<br>혼<br>횡 | 헬<br>핫<br>홀<br>훼 | 혐<br>황<br>홈<br>휭 | 호<br>회<br>홉<br>획 | 혹<br>홰<br>훗<br>횟 | 혼<br>홱<br>후<br>훵 | 혼<br>홱<br>훅<br>호 | 홀<br>횃<br>훌<br>횔 | 홅<br>행<br>훈<br>휴 | 홈<br>회<br>훌<br>훔 | 홉<br>획<br>훔<br>흘 | 훗<br>훙<br>훤<br>흠 | 홍<br>홅<br>훨<br>흡 | 홑<br>훠<br>훰<br>홈 | 화<br>횟<br>홈<br>흡 | 환<br>확<br>횡<br>훗 |

FIG. 6J

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| c9 | a0<br>b0<br>c0<br>d0<br>e0<br>f0 | \multicolumn{16}{l}{USER'S DEPFINITION REGION FOR HANGUL} | | | | | | | | | | | | | | | |
| ca | a0<br>b0<br>c0<br>d0<br>e0<br>f0 | 歌各懇間憾 | 伽珂恪揀坚戡 | 佳痂慤杆喝敢 | 假稼殼東曷柑 | 價苛珏桿渴橄 | 加茄脚間碣減 | 可街覺癎竭甘 | 呵袈角看葛府 | 哥訶閣碣褐監 | 嘉賈侃硼蝎瞰 | 嫁迦刊程蝎紺 | 家軻墾竿輯邯 | 暇柯奸簡勘鑑 | 架駕奸肝坎鑒 | 枷刻姦艮堪龕 | 柯却幹諌感 |
| cb | a0<br>b0<br>c0<br>d0<br>e0<br>f0 | 江价豈據慇 | 匣畺個鍵擧楗 | 岬疆凱開渠腱 | 甲綱埼喀炬慶 | 鉀綛愷客袪寋 | 閘羌愾坑距鍵 | 剛腔慨更踞竅 | 堈紅概梗車乞 | 姜姰漑糠遣傑 | 岡溘亦倨鉅杰 | 尙讲皆去鋸桀 | 康鋼蓋居乾俸 | 强籬箇巨件劍 | 彊降芥拒健劒 | 儢介巾検儉 | 慨蓋據建俞 |
| cc | a0<br>b0<br>c0<br>d0<br>e0<br>f0 | 瞼隔缺坰璥 | 鈐堅訣兼境瓊 | 黔牽兼懷庚痤 | 劫犬甄箝慶硬 | 怯甄繭譫憬磬 | 迲絹鉗鉗擎竟 | 偈肩鎌京敬競 | 憩見徑倂景柯 | 揭譴倨倔暘經 | 擊違儆徹更耕 | 格鵾傾勁硬耿 | 檄抉勍敻莖 | 激決溧炔警 | 隔潔契烟輕 | 顎卿結遈城 |
| cd | a0<br>b0<br>c0<br>d0<br>e0<br>f0 | 叩癌臯昆恐 | 棨告皐稿皐梱拱 | 溪呱舉稿雇梱拱 | 界固稿燕顧滚控 | 癸姑考高琨攻 | 磎孤股鼓衰琅 | 稽尻庫哭鼠空 | 系庫膏斛汨蚣 | 繁拷苦曲滑貢 | 繼扱苽楷骨瞽 | 計故敲敎供串 | 誠敦藁谷公案 | 谿翠蠱鵠共戈 | 階枯袴困功果 | 鷄橘誥坤孔瓜 | 古沽賈蓂工 |

FIG. 6K

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| ce | a0<br>b0<br>c0<br>d0<br>e0<br>f0 | <br>寬<br>括<br>掛<br>僑<br>蕎 | 科<br>慣<br>适<br>野<br>咬<br>蛟 | 菓<br>棺<br>侊<br>乖<br>喬<br>較 | 誇<br>款<br>光<br>傀<br>嬌<br>橋 | 課<br>灌<br>匡<br>塊<br>嶠<br>郊 | 跨<br>璀<br>壙<br>壞<br>巧<br>餃 | 過<br>琯<br>廣<br>怪<br>攪<br>驕 | 鍋<br>罐<br>曠<br>愧<br>敎<br>餃 | 顆<br>菅<br>洸<br>拐<br>校<br>丘 | 廓<br>觀<br>眖<br>拐<br>橋<br>久 | 槨<br>狂<br>魁<br>槐<br>狡<br>九 | 壟<br>宏<br>皎<br>仇 | 郭<br>館<br>紘<br>宏<br>矯<br>俱 | 串<br>關<br>筦<br>肱<br>絞<br>具 | 冠<br>刮<br>鑛<br>轟<br>翹<br>勾 | 官<br>恝<br>卦<br>交<br>膠 |
| cf | a0<br>b0<br>c0<br>d0<br>e0<br>f0 | <br>構<br>舅<br>國<br>宮<br>厥 | 區<br>歐<br>舊<br>局<br>弓<br>獗 | 口<br>毆<br>苟<br>菊<br>穹<br>蕨 | 句<br>毬<br>衢<br>鞠<br>窮<br>蹶 | 各<br>求<br>謳<br>鞫<br>芎<br>闕 | 嘔<br>溝<br>購<br>麴<br>躬<br>机 | 坵<br>灸<br>軀<br>君<br>倦<br>櫃 | 垢<br>狗<br>玖<br>窘<br>券<br>潰 | 寇<br>玖<br>玖<br>群<br>勸<br>脆 | 嶇<br>球<br>邱<br>裙<br>卷<br>軌 | 廐<br>瞿<br>述<br>鈎<br>軍<br>圈<br>餽 | 懼<br>矩<br>駒<br>郡<br>拳<br>句 | 拘<br>究<br>駒<br>堀<br>捲<br>匙 | 敎<br>絿<br>鳩<br>屈<br>權<br>歸 | 枸<br>考<br>鷗<br>掘<br>港<br>貴 | 樞<br>臼<br>龜<br>窟<br>眷 |
| d0 | a0<br>b0<br>c0<br>d0<br>e0<br>f0 | <br>逵<br>隙<br>契<br>及<br>圻 | 鬼<br>闈<br>僅<br>今<br>急<br>基 | 龜<br>勻<br>勵<br>妗<br>扱<br>埼 | 叫<br>均<br>勤<br>擒<br>汲<br>夔 | 圭<br>昀<br>懃<br>吟<br>級<br>奇 | 奎<br>筠<br>斤<br>檎<br>給<br>妓 | 揆<br>菌<br>根<br>琴<br>亘<br>寄 | 槻<br>鈞<br>槿<br>禁<br>兢<br>岐 | 珪<br>橘<br>禽<br>芩<br>崎 | 硅<br>瑾<br>筋<br>衿<br>矜<br>己 | 窺<br>剞<br>童<br>芹<br>肯<br>幾 | 竅<br>劇<br>觀<br>衾<br>企<br>忌 | 糾<br>戟<br>襟<br>伎<br>技 | 葵<br>棘<br>謹<br>金<br>冀<br>旗 | 規<br>極<br>近<br>錦<br>嗜<br>旣 | 赳<br>極<br>饉<br>及<br>器 |
| d1 | a0<br>b0<br>c0<br>d0<br>e0<br>f0 | <br>璣<br>記<br>桔<br>遲<br>闌 | 碁<br>畸<br>譏<br>金<br>那<br>難 | 期<br>棋<br>豈<br>喫<br>樂<br>鸞 | 杞<br>碁<br>起<br>儺<br>洛<br>捏 | 棋<br>磯<br>錡<br>喇<br>烙<br>捺 | 棄<br>祈<br>錤<br>奈<br>珞<br>南 | 機<br>祇<br>飢<br>拏<br>落<br>嵐 | 欺<br>祈<br>饑<br>拿<br>諾<br>枏 | 氣<br>祺<br>騎<br>橠<br>酪<br>楠 | 汽<br>箕<br>騏<br>懦<br>駱<br>溺 | 沂<br>紀<br>驥<br>拿<br>亂<br>濫 | 淇<br>綺<br>麒<br>拏<br>卵<br>男 | 玘<br>羈<br>緊<br>顠<br>暖<br>藍 | 琦<br>耆<br>佶<br>羅<br>欄<br>襤 | 琪<br>機<br>吉<br>螺<br>燠<br>拉 | 堪<br>肌<br>拮<br>裸<br>爛 |
| d2 | a0<br>b0<br>c0<br>d0<br>e0<br>f0 | <br>奈<br>弩<br>祿<br>腦<br>勒 | 納<br>耐<br>怒<br>緣<br>路<br>肋 | 臘<br>冷<br>努<br>茶<br>雷<br>凜 | 蠟<br>女<br>擄<br>鹿<br>尿<br>凌 | 衲<br>年<br>櫨<br>錄<br>稜<br>稜 | 囊<br>撚<br>爐<br>碌<br>綾<br>綾 | 娘<br>秊<br>瑠<br>論<br>能<br>能 | 廊<br>念<br>盧<br>壟<br>菱<br>菱 | 朗<br>恬<br>老<br>腰<br>陵<br>陵 | 浪<br>拈<br>蘆<br>漏<br>尼<br>尼 | 狼<br>捻<br>虜<br>淚<br>累<br>泥 | 郎<br>寧<br>籠<br>漏<br>縷<br>縷 | 乃<br>露<br>聾<br>陋<br>陋 | 來<br>努<br>駑<br>濃<br>嫩<br>訥 | 內<br>勞<br>鷺<br>農<br>嫩<br>多 | 奈<br>奴<br>碌<br>磊<br>紐<br>茶 |

FIG. 6L

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| d3 | a0<br>b0<br>c0<br>d0<br>e0<br>f0 | 毅<br>湛<br>唐<br>岱<br>到 | 丹<br>蛋<br>潭<br>堂<br>帶<br>圖 | 亶<br>担<br>澹<br>塘<br>待<br>堵 | 但<br>鄲<br>瘀<br>幢<br>戴<br>塗 | 單<br>鍛<br>聃<br>憻<br>替<br>導 | 團<br>撻<br>膽<br>戀<br>黛<br>屠 | 壇<br>澾<br>蕁<br>撑<br>岱<br>島 | 彈<br>獺<br>罩<br>棠<br>袋<br>嶋 | 斷<br>疸<br>談<br>當<br>貸<br>度 | 旦<br>達<br>譚<br>糖<br>隊<br>徒 | 檀<br>哒<br>錟<br>瞪<br>黛<br>悼 | 段<br>坍<br>杏<br>黛<br>宅<br>挑 | 湍<br>儋<br>畓<br>代<br>德<br>掉 | 短<br>擔<br>答<br>岱<br>大<br>惠 | 端<br>疊<br>踏<br>倒<br>倒<br>桃 | 簞<br>淡<br>逐<br>對<br>刀<br>跳 |
| d4 | a0<br>b0<br>c0<br>d0<br>e0<br>f0 | 蹈<br>羸<br>凍<br>斗<br>得 | 棹<br>逃<br>讀<br>動<br>杜<br>橙 | 櫂<br>途<br>墩<br>同<br>料<br>橙 | 淘<br>道<br>惇<br>憧<br>痘<br>燈 | 渡<br>都<br>敦<br>東<br>竇<br>登 | 浴<br>鍍<br>旽<br>董<br>蕫<br>等 | 濤<br>陶<br>暾<br>桐<br>蕫<br>藤 | 燾<br>韜<br>沌<br>棟<br>蕫<br>謄 | 盜<br>毒<br>焞<br>洞<br>豆<br>部 | 睹<br>瀆<br>燉<br>潼<br>逗<br>騰 | 禱<br>犢<br>豚<br>疼<br>頭<br>喇 | 稻<br>牘<br>頓<br>瞳<br>屯<br>喇 | 萄<br>獨<br>乭<br>童<br>臀<br>拏 | 覩<br>督<br>突<br>胴<br>芚<br>顠 | 賭<br>禿<br>仝<br>董<br>遁<br>鑼 | 跳<br>篤<br>冬<br>兜<br>鈍<br>羅 |
| d5 | a0<br>b0<br>c0<br>d0<br>e0<br>f0 | 卵<br>藍<br>徠<br>輛<br>駈 | 蘿<br>欄<br>襤<br>萊<br>量<br>臚 | 螺<br>爛<br>覽<br>冷<br>侶<br>麗 | 裸<br>瀾<br>拉<br>掠<br>儷<br>黎 | 邏<br>爛<br>臘<br>略<br>勵<br>力 | 樂<br>蘭<br>蠟<br>亮<br>呂<br>唇 | 洛<br>鸞<br>廊<br>倆<br>廬<br>歷 | 烙<br>刺<br>朗<br>兩<br>慮<br>瀝 | 珞<br>辣<br>浪<br>涼<br>戾<br>礫 | 絡<br>嵐<br>狼<br>梁<br>旅<br>櫟 | 落<br>寧<br>琅<br>樑<br>櫚<br>靂 | 諾<br>攬<br>瑯<br>粮<br>濾<br>憐 | 酪<br>欖<br>螂<br>梁<br>礪<br>攣 | 駱<br>濫<br>郎<br>良<br>藜<br>聯 | 丹<br>籃<br>來<br>諒<br>蠣<br>漣 | 亂<br>纜<br>峽<br>閭<br>間 |
| d6 | a0<br>b0<br>c0<br>d0<br>e0<br>f0 | 斂<br>聆<br>櫓<br>綠<br>磊 | 煉<br>殮<br>逞<br>潞<br>蘆<br>路 | 璉<br>濂<br>鈴<br>瀘<br>菉<br>賚 | 練<br>簾<br>零<br>爐<br>錄<br>賴 | 聯<br>獵<br>靈<br>盧<br>鹿<br>雷 | 蓮<br>令<br>領<br>老<br>麓<br>了 | 螢<br>伶<br>齡<br>蘆<br>論<br>僚 | 連<br>囹<br>例<br>虜<br>聾<br>寮 | 鍊<br>寧<br>澧<br>路<br>弄<br>廖 | 列<br>岺<br>禮<br>輅<br>朧<br>料 | 劣<br>嶺<br>醴<br>露<br>瀧<br>燎 | 烈<br>怜<br>隸<br>魯<br>籠<br>療 | 裂<br>玲<br>勞<br>鷺<br>壟<br>瞭 | 廉<br>羚<br>怒<br>鹵<br>雙<br>聊 | 簾<br>翎<br>撈<br>碌<br>僂<br>蓼 | 廊<br>岺<br>祿<br>牢 |
| d7 | a0<br>b0<br>c0<br>d0<br>e0<br>f0 | 陋<br>戮<br>凌<br>犁<br>吝 | 遼<br>劉<br>陸<br>楞<br>狸<br>潾 | 鬧<br>旒<br>侖<br>稜<br>理<br>燐 | 龍<br>柳<br>倫<br>綾<br>璃<br>璘 | 壘<br>榴<br>崙<br>菱<br>異<br>藺 | 婁<br>流<br>淪<br>陵<br>痢<br>躪 | 屢<br>溜<br>綸<br>俚<br>罹<br>隣 | 樓<br>瀏<br>輪<br>利<br>羸<br>鱗 | 淚<br>琉<br>律<br>俐<br>鸁<br>麟 | 漏<br>瑠<br>慄<br>吏<br>莉<br>林 | 瘦<br>留<br>栗<br>履<br>裏<br>淋 | 累<br>瘤<br>率<br>俐<br>裡<br>琳 | 縲<br>硫<br>隆<br>里<br>里<br>臨 | 蔞<br>謬<br>勒<br>李<br>鯉<br>霖 | 樓<br>類<br>肋<br>梨<br>離<br>砬 | 鏤<br>六<br>凜<br>俚<br>鯉<br>立 |

FIG. 6M

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| d8 | a0 |  | 立 | 笠 | 粒 | 摩 | 瑪 | 痲 | 碼 | 磨 | 馬 | 魔 | 麻 | 寞 | 幕 | 漠 | 膜 |
|  | b0 | 莫 | 邈 | 蠻 | 万 | 卍 | 娩 | 懣 | 彎 | 抹 | 慢 | 挽 | 晩 | 曼 | 滿 | 漫 | 瞞 | 萬 | 忙 |
|  | c0 | 夢 | 蠻 | 輓 | 饅 | 鰻 | 唜 | 末 | 沫 | 茉 | 襪 | 靺 | 亡 | 妄 | 忘 | 忙 |
|  | d0 | 望 | 網 | 罔 | 芒 | 茫 | 莽 | 輞 | 邙 | 埋 | 妹 | 媒 | 寐 | 昧 | 枚 | 梅 | 每 |
|  | e0 | 煤 | 罵 | 買 | 賣 | 邁 | 魅 | 脈 | 貊 | 陌 | 驀 | 麥 | 孟 | 氓 | 猛 | 盲 | 盟 |
|  | f0 | 萌 | 冪 | 覓 | 免 | 冕 | 勉 | 棉 | 沔 | 眄 | 眠 | 綿 | 緬 | 面 | 麪 | 滅 |
| d9 | a0 |  | 蔑 | 冥 | 名 | 命 | 明 | 暝 | 椧 | 溟 | 皿 | 瞑 | 茗 | 蓂 | 螟 | 酩 | 銘 |
|  | b0 | 鳴 | 袂 | 侮 | 冒 | 募 | 姆 | 帽 | 慕 | 摸 | 摹 | 暮 | 某 | 模 | 母 | 毛 | 牟 |
|  | c0 | 牡 | 瑁 | 眸 | 矛 | 耗 | 芼 | 茅 | 謀 | 謨 | 貌 | 木 | 沐 | 牧 | 目 | 睦 | 穆 |
|  | d0 | 鶩 | 歿 | 沒 | 夢 | 朦 | 蒙 | 卯 | 墓 | 妙 | 廟 | 描 | 昴 | 杳 | 渺 | 猫 | 竗 |
|  | e0 | 苗 | 錨 | 務 | 巫 | 憮 | 懋 | 戊 | 拇 | 撫 | 无 | 楙 | 武 | 母 | 無 | 珷 | 畝 |
|  | f0 | 繆 | 舞 | 茂 | 蕪 | 誣 | 貿 | 霧 | 鵡 | 墨 | 默 | 們 | 刎 | 吻 | 問 | 文 |
| da | a0 |  | 汶 | 紊 | 紋 | 聞 | 蚊 | 門 | 雯 | 勿 | 沕 | 物 | 味 | 媚 | 尾 | 嵋 | 彌 |
|  | b0 | 微 | 未 | 梶 | 楣 | 渼 | 湄 | 眉 | 米 | 美 | 薇 | 謎 | 迷 | 靡 | 黴 | 岷 | 悶 |
|  | c0 | 愍 | 憫 | 敏 | 旻 | 旼 | 民 | 泯 | 玟 | 珉 | 緡 | 閔 | 密 | 蜜 | 謐 | 剝 | 博 |
|  | d0 | 拍 | 搏 | 撲 | 朴 | 樸 | 泊 | 珀 | 璞 | 箔 | 粕 | 縛 | 膊 | 舶 | 薄 | 迫 | 雹 |
|  | e0 | 駁 | 伴 | 半 | 反 | 叛 | 拌 | 搬 | 攀 | 斑 | 槃 | 泮 | 潘 | 班 | 畔 | 瘢 | 盤 |
|  | f0 | 盼 | 磐 | 磻 | 礬 | 絆 | 般 | 蟠 | 返 | 頒 | 飯 | 勃 | 拔 | 撥 | 渤 | 澄 |
| db | a0 |  | 發 | 跋 | 醱 | 鉢 | 髮 | 魃 | 倣 | 傍 | 坊 | 妨 | 尨 | 幇 | 彷 | 房 | 放 |
|  | b0 | 方 | 旁 | 昉 | 枋 | 榜 | 滂 | 磅 | 紡 | 肪 | 膀 | 舫 | 芳 | 蒡 | 蚌 | 訪 | 謗 |
|  | c0 | 邦 | 防 | 龐 | 倍 | 俳 | 北 | 培 | 徘 | 拜 | 排 | 杯 | 湃 | 焙 | 盃 | 背 | 胚 |
|  | d0 | 裴 | 裵 | 褙 | 賠 | 輩 | 配 | 陪 | 伯 | 佰 | 帛 | 柏 | 栢 | 白 | 百 | 魄 | 幡 |
|  | e0 | 樊 | 煩 | 燔 | 番 | 磻 | 繁 | 蕃 | 藩 | 飜 | 伐 | 筏 | 罰 | 閥 | 凡 | 帆 | 梵 |
|  | f0 | 氾 | 汎 | 泛 | 犯 | 範 | 范 | 法 | 琺 | 僻 | 劈 | 壁 | 擘 | 檗 | 璧 | 癖 |
| dc | a0 |  | 碧 | 蘗 | 闢 | 霹 | 便 | 卞 | 弁 | 變 | 辨 | 辯 | 邊 | 別 | 瞥 | 繁 | 蕨 |
|  | b0 | 丙 | 倂 | 兵 | 屛 | 幷 | 昞 | 昺 | 柄 | 棅 | 炳 | 甁 | 病 | 秉 | 竝 | 輧 | 餠 |
|  | c0 | 騈 | 保 | 堡 | 報 | 寶 | 普 | 步 | 洑 | 湺 | 潽 | 珤 | 甫 | 菩 | 補 | 褓 | 譜 |
|  | d0 | 輔 | 伏 | 僕 | 匐 | 卜 | 宓 | 復 | 服 | 福 | 腹 | 茯 | 菔 | 複 | 覆 | 輹 | 輻 |
|  | e0 | 馥 | 鰒 | 本 | 乶 | 俸 | 奉 | 封 | 峯 | 峰 | 捧 | 棒 | 烽 | 熢 | 琫 | 夫 | 婦 |
|  | f0 | 蜂 | 逢 | 鋒 | 鳳 | 不 | 付 | 俯 | 傅 | 剖 | 副 | 否 | 咐 | 埠 | 夫 | 婦 |

FIG. 6N

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| dd | a0<br>b0<br>c0<br>d0<br>e0<br>f0 | <br><br><br>糞<br>丕<br>忿 | <br>腐<br>北<br>紛<br>備<br>吡 | 駙<br>膚<br>分<br>芬<br>匕<br>毘 | 孵<br>鮒<br>吩<br>貧<br>匪<br>沸 | 富<br>芙<br>噴<br>雰<br>卑<br>泌 | 府<br>莩<br>墳<br>不<br>妃<br>琵 | 復<br>訃<br>憤<br>佛<br>婢<br>痺 | 扶<br>負<br>奔<br>弗<br>庇<br>砒 | 敷<br>賦<br>奮<br>佛<br>悲<br>碑 | 斧<br>賻<br>忿<br>怫<br>懺<br>秕 | 浮<br>赴<br>跌<br>扮<br>扉<br>秘 | 薄<br>跛<br>盼<br>朋<br>批<br>枇 | 父<br>部<br>汾<br>棚<br>斐<br>緋 | 符<br>釜<br>焚<br>硼<br>枇<br>翡 | 薄<br>阜<br>盆<br>硼<br>榧<br>肥 | 缶<br>附<br>粉<br>繃<br>比 | 腐<br>駙<br>粉<br>鵬<br>比 |
| de | a0<br>b0<br>c0<br>d0<br>e0<br>f0 | <br><br>斌<br>寫<br>渣<br>裟 | <br>脾<br>檳<br>些<br>寺<br>瀉<br>詐 | 臂<br>殯<br>仕<br>射<br>獅<br>詞 | 韮<br>濱<br>伺<br>已<br>獅<br>謝 | 蚕<br>瀕<br>似<br>師<br>砂<br>賜 | 神<br>牝<br>使<br>社<br>祀<br>赦 | 誹<br>牝<br>俟<br>徙<br>祀<br>辭 | 誓<br>批<br>史<br>思<br>私<br>邪 | 費<br>貧<br>僿<br>捨<br>篩<br>飼 | 部<br>賓<br>斯<br>斜<br>紗<br>駟 | 非<br>頻<br>嗣<br>栖<br>絲<br>麝 | 飛<br>憑<br>俊<br>査<br>肆<br>削 | 鼻<br>氷<br>四<br>梭<br>舍<br>數 | 嚬<br>聘<br>士<br>死<br>莎<br>朔 | 嬪<br>聘<br>奢<br>沙<br>娑<br>索 | 彬<br>乍<br>姿<br>泗<br>蛇 | 彬<br>乍<br>姿<br>泗<br>蛇 |
| df | a0<br>b0<br>c0<br>d0<br>e0<br>f0 | <br><br>煞<br>像<br>爽<br>恕 | <br>傘<br>薩<br>償<br>牀<br>塞<br>抒 | 冊<br>三<br>商<br>狀<br>稙<br>捿 | 山<br>參<br>喪<br>相<br>索<br>紓 | 散<br>杉<br>甞<br>祥<br>色<br>暑 | 汕<br>森<br>嘗<br>箱<br>性<br>曙 | 冊<br>滲<br>孀<br>翔<br>生<br>書 | 産<br>艾<br>尚<br>裳<br>甥<br>栖 | 疝<br>蔘<br>常<br>觴<br>省<br>棲 | 算<br>衫<br>床<br>詳<br>笙<br>犀 | 蒜<br>挿<br>庠<br>廂<br>笙<br>瑞 | 酸<br>澁<br>廂<br>賞<br>霜<br>箎 | 散<br>殺<br>桑<br>霜<br>嶼<br>絮 | 芟<br>颯<br>橡<br>塞<br>序<br>絮 | 撒<br>上<br>湘<br>璽<br>庶<br>署 | 殺<br>傷<br>湘<br>賽<br>徐<br>署 | |
| e0 | a0<br>b0<br>c0<br>d0<br>e0<br>f0 | <br>析<br>敫<br>辭<br>薛<br>變 | <br>胥<br>汐<br>旋<br>蟬<br>褻<br>葉 | 舒<br>浙<br>詵<br>跣<br>設<br>城 | 薯<br>潟<br>渲<br>跣<br>說<br>姓 | 西<br>石<br>煽<br>選<br>姓<br>宬 | 誓<br>碩<br>琁<br>銑<br>雪<br>性 | 逝<br>蓆<br>璇<br>鐥<br>說<br>惺 | 鋤<br>釋<br>璿<br>饍<br>姓<br>成 | 黍<br>錫<br>瑄<br>鮮<br>姓<br>星 | 鼠<br>薛<br>繕<br>羨<br>盛<br>晟 | 夕<br>仙<br>禪<br>屑<br>蟾<br>猩 | 奭<br>線<br>繕<br>楔<br>贍<br>珹 | 席<br>先<br>繕<br>泄<br>閃<br>盛 | 惜<br>善<br>腺<br>洩<br>陜<br>省 | 昔<br>嬋<br>膳<br>渫<br>攝<br>戚 | 宣<br>船<br>舌<br>涉 | 皙<br>扇<br>船<br>舌<br>涉 |
| e1 | a0<br>b0<br>c0<br>d0<br>e0<br>f0 | <br>嘯<br>燒<br>邵<br>蔬<br>鎖 | <br>聖<br>塑<br>甦<br>銷<br>遜<br>衰 | 聲<br>宵<br>疏<br>韶<br>逡<br>剡 | 腥<br>小<br>疎<br>騷<br>淞<br>剡 | 誠<br>少<br>瘙<br>宋<br>悚<br>修 | 醒<br>巢<br>笑<br>俗<br>悚<br>受 | 世<br>所<br>屬<br>束<br>嗽<br>囚 | 勢<br>歲<br>掃<br>松<br>垂 | 歲<br>搔<br>素<br>淞<br>壽 | 洗<br>昭<br>粟<br>訟<br>嫂 | 稅<br>笊<br>粟<br>誦<br>守 | 笹<br>沼<br>蔬<br>頌<br>岫 | 細<br>消<br>蘇<br>送<br>帥 | 說<br>溯<br>訴<br>孫<br>殺 | 貰<br>逍<br>遡<br>孫<br>愁 | 召<br>炤<br>遡<br>損<br>碎 | |

FIG. 60

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| e2 | a0<br>b0<br>c0<br>d0<br>e0<br>f0 | 璢<br>袖<br>髓<br>循<br>荀 | 戍<br>痩<br>誰<br>鬚<br>徇<br>蕁 | 手<br>睡<br>讐<br>叔<br>旬<br>薺 | 授<br>粹<br>輯<br>夙<br>枸<br>詢 | 捜<br>穗<br>遂<br>塾<br>楯<br>諄 | 收<br>堅<br>醉<br>夙<br>榆<br>醇 | 數<br>粹<br>酬<br>孰<br>殉<br>錞 | 樹<br>綏<br>銖<br>宿<br>淳<br>順 | 殊<br>綬<br>銹<br>淑<br>潤<br>馴 | 水<br>羞<br>隋<br>祝<br>盾<br>戍 | 洙<br>隆<br>隨<br>璃<br>瞬<br>術 | 漱<br>脩<br>瑞<br>肅<br>筍<br>述 | 燃<br>茱<br>需<br>蒐<br>笋<br>鉥 | 狩<br>蒐<br>脩<br>蒭<br>純<br>崇 | 獸<br>修<br>須<br>蹉<br>脣<br>崧 | 珸<br>首<br>徇<br>巡<br>舜 |
| e3 | a0<br>b0<br>c0<br>d0<br>e0<br>f0 | 昇<br>是<br>垣<br>侫<br>蓋 | 嵩<br>縄<br>時<br>寔<br>信<br>蝨 | 惡<br>蠅<br>柿<br>式<br>呻<br>訊 | 膝<br>陞<br>柴<br>振<br>身 | 蝨<br>侍<br>猜<br>息<br>拭<br>辰<br>辛 | 濕<br>匙<br>矢<br>植<br>慎<br>迅 | 拾<br>嘶<br>示<br>殖<br>新<br>失 | 習<br>始<br>翅<br>湜<br>晨<br>室 | 褶<br>姉<br>蒔<br>熄<br>燎<br>實 | 嬰<br>尸<br>蓍<br>爓<br>申<br>悉 | 丞<br>屎<br>簽<br>蝕<br>神<br>審 | 乘<br>市<br>蓍<br>識<br>紳<br>尋 | 僧<br>弑<br>視<br>試<br>食<br>腎<br>臣 | 勝<br>侍<br>諡<br>詩<br>飾<br>心 | 升<br>豕<br>豕<br>食<br>臣<br>沁 | 承<br>施<br>豺<br>伸<br>莘<br>薪 |
| e4 | a0<br>b0<br>c0<br>d0<br>e0<br>f0 | 娥<br>嶽<br>案<br>菴<br>崖 | 沈<br>峨<br>輕<br>眼<br>闇<br>愛 | 深<br>我<br>惡<br>雁<br>壓<br>曖 | 潯<br>牙<br>愕<br>鞍<br>押<br>涯 | 甚<br>芽<br>握<br>顏<br>狎<br>碍 | 芯<br>峨<br>樂<br>鮟<br>鴨<br>艾 | 諶<br>蛾<br>渥<br>幹<br>仰<br>錏 | 什<br>衙<br>渴<br>軋<br>央<br>靄 | 十<br>訝<br>鄂<br>謁<br>快<br>姶 | 拾<br>阿<br>鍔<br>閼<br>昂<br>扼 | 雙<br>雅<br>顎<br>關<br>映<br>按 | 氏<br>餓<br>鰐<br>岩<br>秧<br>液 | 亞<br>鴉<br>鯉<br>巖<br>篇<br>掖 | 俄<br>鶯<br>安<br>庵<br>篦<br>腋 | 兒<br>堊<br>按<br>暗<br>哀<br>額 | 啞<br>岳<br>晏<br>癌<br>埃 |
| e5 | a0<br>b0<br>c0<br>d0<br>e0<br>f0 | 弱<br>揚<br>良<br>魚<br>儼 | 櫻<br>掠<br>攘<br>襄<br>鰯<br>嚴 | 醫<br>略<br>敭<br>諒<br>億<br>奄 | 鶯<br>約<br>暘<br>遼<br>憶<br>掩 | 鸚<br>若<br>梁<br>穰<br>抑<br>淹 | 也<br>葯<br>楊<br>禳<br>檐<br>巢 | 倻<br>藥<br>樣<br>讓<br>膁<br>業 | 冶<br>躍<br>洋<br>量<br>儼<br>円 | 夜<br>蹉<br>瀁<br>養<br>偃<br>予 | 惹<br>亮<br>煬<br>圄<br>堰<br>余 | 揶<br>佯<br>痒<br>御<br>彦<br>勵 | 椰<br>兩<br>瘍<br>漁<br>焉<br>呂 | 爺<br>凉<br>禳<br>漁<br>諺<br>女 | 耶<br>壤<br>穰<br>語<br>孼<br>如 | 若<br>孃<br>楹<br>語<br>藥<br>廬 | 野<br>羔<br>羊<br>馭<br>俺 |
| e6 | a0<br>b0<br>c0<br>d0<br>e0<br>f0 | 麗<br>堧<br>淵<br>輾<br>熱 | 旅<br>黎<br>姸<br>演<br>聯<br>裂 | 歟<br>亦<br>娟<br>漣<br>衍<br>說 | 汝<br>力<br>宴<br>烟<br>軟<br>閱 | 濾<br>域<br>年<br>然<br>鶯<br>厭 | 璵<br>役<br>延<br>煙<br>蓮<br>廉 | 礜<br>易<br>延<br>燐<br>連<br>念 | 礪<br>曆<br>憐<br>煉<br>鉛<br>捻 | 與<br>歷<br>戀<br>燕<br>鍊<br>染 | 餘<br>疫<br>捐<br>挻<br>璉<br>殮 | 茹<br>繹<br>挺<br>璉<br>列<br>灸 | 輿<br>譯<br>攣<br>緣<br>劣<br>焔 | 轝<br>櫟<br>沇<br>沿<br>咽<br>琰 | 閭<br>跞<br>沿<br>涎<br>悅<br>艶 | 餘<br>驛<br>涎<br>筵<br>涅<br>苒 | 閬<br>嚥<br>涓<br>練<br>烈 |

FIG. 6P

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| e7 | a0<br>b0<br>c0<br>d0<br>e0<br>f0 | <br>怜<br>瑛<br>領<br>裔<br>嗚 | <br>映<br>瑩<br>乂<br>詣<br>塢 | 簾<br>暎<br>瓔<br>倪<br>響<br>墺 | 閻<br>楹<br>盈<br>例<br>璵<br>奥 | 鸄<br>榮<br>穎<br>刈<br>醴<br>娯 | 鹽<br>永<br>纓<br>叉<br>鋭<br>痼 | 曄<br>泳<br>羚<br>曳<br>隷<br>悟 | 獵<br>潁<br>怜<br>汭<br>寬<br>惡 | 燁<br>瀯<br>英<br>濊<br>預<br>懊 | 葉<br>濚<br>詠<br>猊<br>五<br>敖 | 令<br>瀛<br>迎<br>容<br>伍<br>旿 | 囹<br>瀁<br>鈴<br>穢<br>俉<br>晤 | 塋<br>濚<br>鍈<br>芮<br>傲<br>梧 | 寧<br>熒<br>零<br>藝<br>午<br>汚 | 嶺<br>瑩<br>霊<br>藥<br>吾<br>澳 | 影<br>玲<br>禮<br>呉<br>奧<br> |
| e8 | a0<br>b0<br>c0<br>d0<br>e0<br>f0 | <br>瘟<br>窟<br>緩<br>歪<br>寮 | <br>穩<br>窪<br>瓩<br>矮<br>尿 | 烏<br>縕<br>卧<br>院<br>外<br>嶢 | 熬<br>蘊<br>娃<br>腕<br>鬼<br>拗 | 葵<br>兀<br>蝸<br>芫<br>巍<br>搖 | 瞋<br>塈<br>訛<br>莞<br>猥<br>撓 | 蛾<br>擁<br>婉<br>阮<br>畏<br>擾 | 誤<br>瓮<br>完<br>頑<br>了<br>料 | 鼇<br>甕<br>宛<br>曰<br>僚<br>曜 | 屋<br>饔<br>梡<br>往<br>僥<br>樂 | 沃<br>翁<br>椀<br>旺<br>凹<br>橈 | 獄<br>邕<br>浣<br>枉<br>堯<br>燎 | 玉<br>雍<br>玩<br>汪<br>夭<br>燿 | 鈺<br>甕<br>琓<br>王<br>妖<br>瑤 | 溫<br>渦<br>琬<br>倭<br>姚<br>療 | 瑥<br>瓦<br>碗<br>娃<br>寮<br> |
| e9 | a0<br>b0<br>c0<br>d0<br>e0<br>f0 | <br>欲<br>湧<br>優<br>禹<br>昱 | <br>浴<br>溶<br>又<br>紆<br>栯 | 窈<br>縛<br>熔<br>友<br>羽<br>煜 | 窯<br>褥<br>瑢<br>右<br>芋<br>稶 | 絲<br>耀<br>用<br>宇<br>藕<br>郁 | 繞<br>腰<br>甬<br>寓<br>虞<br>頊 | 耀<br>蓼<br>筆<br>尤<br>迂<br>云 | 腰<br>嶢<br>茸<br>愚<br>遇<br>暈 | 蓼<br>要<br>蓉<br>憂<br>郵<br>櫻 | 嶢<br>謠<br>踊<br>旴<br>釪<br>殞 | 要<br>遙<br>鎔<br>牛<br>隅<br>澐 | 謠<br>墉<br>鏞<br>玗<br>雨<br>煩 | 遙<br>容<br>龍<br>瑀<br>雩<br>耘 | 遼<br>庸<br>于<br>盂<br>勛<br>芸 | 饒<br>溶<br>佑<br>偶<br>或<br>蕓 | 慾<br>涌<br>祐<br>禑<br>旭<br> |
| ea | a0<br>b0<br>c0<br>d0<br>e0<br>f0 | <br>媛<br>遠<br>慰<br>魏<br>愉 | <br>嫄<br>阮<br>曉<br>乳<br>揄 | 運<br>寃<br>院<br>渭<br>侑<br>攸 | 隕<br>怨<br>鴛<br>爲<br>儒<br>有 | 雲<br>愿<br>月<br>瑋<br>俞<br>杻 | 韻<br>願<br>越<br>緯<br>劉<br>柔 | 蔚<br>援<br>鉞<br>胃<br>唯<br>柚 | 鬱<br>沅<br>位<br>萎<br>喩<br>柳 | 亏<br>垣<br>偉<br>葦<br>孺<br>楡 | 熊<br>洹<br>僞<br>蔿<br>宥<br>楢 | 雄<br>湲<br>位<br>蝟<br>幼<br>油 | 元<br>源<br>猨<br>衛<br>幽<br>洧 | 原<br>爰<br>瑗<br>褘<br>庾<br>流 | 員<br>猿<br>苑<br>謂<br>悠<br>游 | 圓<br>園<br>委<br>違<br>惟<br>溜 | 垣<br>轅<br>威<br>韋<br>愈<br> |
| eb | a0<br>b0<br>c0<br>d0<br>e0<br>f0 | <br>諛<br>育<br>楝<br>乙<br>儀 | <br>諭<br>陸<br>栗<br>吟<br>宜 | 濡<br>猶<br>倫<br>率<br>淫<br>意 | 孺<br>獒<br>崙<br>聿<br>蔭<br>懿 | 琉<br>踰<br>允<br>戎<br>擬<br>擬 | 瑜<br>遊<br>奫<br>尹<br>陰<br>椅 | 由<br>逾<br>尹<br>融<br>音<br>毅 | 留<br>嵩<br>融<br>絨<br>飮<br>疑 | 瘉<br>崧<br>潤<br>隆<br>揖<br>矣 | 硫<br>釉<br>綸<br>隆<br>泣<br>義 | 紐<br>鍮<br>琉<br>垠<br>凝<br>羲 | 維<br>類<br>胤<br>恩<br>應<br>義 | 奧<br>六<br>贇<br>慇<br>膺<br>薏 | 萸<br>堉<br>輪<br>殷<br>膺<br>議 | 裕<br>戮<br>鈗<br>誾<br>鷹<br>依 | 誘<br>肉<br>律<br>銀<br>倚<br>誼 |

FIG. 6Q

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| ec | a0<br>b0<br>c0<br>d0<br>e0<br>f0 | <br>李<br>裏<br>證<br>茵<br>鎰 | 讓<br>梨<br>裡<br>人<br>闓<br>馹 | 醫<br>泥<br>貳<br>仁<br>蚓<br>任 | 二<br>爾<br>貽<br>刃<br>認<br>壬 | 以<br>珥<br>邇<br>印<br>隣<br>妊 | 伊<br>理<br>咅<br>吝<br>軔<br>姙 | 利<br>異<br>離<br>咽<br>靭<br>恁 | 吏<br>里<br>飴<br>因<br>鱗<br>林 | 夷<br>痍<br>餌<br>姻<br>麟<br>淋 | 姨<br>痢<br>匿<br>寅<br>一<br>稔 | 履<br>罹<br>溺<br>引<br>佚<br>臨 | 已<br>而<br>湮<br>忍<br>佾<br>恁 | 弛<br>邇<br>益<br>璽<br>壹<br>賃 | 彛<br>肄<br>翊<br>燐<br>日<br>入 | 怡<br>苡<br>翌<br>璘<br>溢<br>廿 | 易<br>荑<br>絪<br>絪<br>逸<br>  |
| ed | a0<br>b0<br>c0<br>d0<br>e0<br>f0 | <br>恣<br>資<br>棧<br>壯<br>  | 立<br>慈<br>雌<br>殘<br>奬<br>璋 | 笠<br>滋<br>作<br>潺<br>將<br>章 | 粒<br>炙<br>勺<br>盞<br>牂<br>粧 | 仍<br>煮<br>嚼<br>岑<br>帳<br>腸 | 剩<br>茲<br>斫<br>暫<br>庄<br>臟 | 孕<br>疵<br>昨<br>潛<br>張<br>戕 | 芿<br>磁<br>灼<br>箴<br>掌<br>莊 | 仔<br>雌<br>炸<br>簪<br>暲<br>葬 | 刺<br>紫<br>爵<br>蠶<br>樟<br>蔣 | 杏<br>絳<br>雜<br>檣<br>薔<br>薔 | 姉<br>自<br>丈<br>藏<br>藏<br>  | 姿<br>芡<br>仗<br>機<br>装<br>臟 | 子<br>燕<br>匠<br>漿<br>牆<br>腎 | 字<br>藉<br>鵲<br>場<br>狀<br>長 | 孜<br>諮<br>屏<br>墻<br>獐<br>  |
| ee | a0<br>b0<br>c0<br>d0<br>e0<br>f0 | <br>載<br>樗<br>邸<br>籍<br>典 | 障<br>齋<br>沮<br>疽<br>翟<br>前 | 再<br>賫<br>渚<br>鉏<br>荻<br>剪 | 哉<br>爭<br>狙<br>勣<br>謫<br>塡 | 在<br>箏<br>豬<br>弔<br>賊<br>塼 | 宰<br>靜<br>疽<br>嫡<br>赤<br>奠 | 才<br>錚<br>疽<br>寂<br>跡<br>專 | 材<br>崢<br>筬<br>摘<br>蹟<br>展 | 栽<br>伫<br>苧<br>敵<br>滴<br>塵 | 梓<br>低<br>菹<br>滴<br>迹<br>俊 | 渽<br>儲<br>菹<br>狄<br>適<br>戰 | 滓<br>咀<br>著<br>的<br>炙<br>栓 | 災<br>姐<br>藷<br>狄<br>鏑<br>佃 | 縡<br>底<br>詛<br>貯<br>积<br>殿 | 裁<br>杵<br>躇<br>笛<br>傳<br>氈 | 財<br>楮<br>這<br>籍<br>全<br>澱 |
| ef | a0<br>b0<br>c0<br>d0<br>e0<br>f0 | <br>銓<br>岾<br>呈<br>椵<br>穿 | 煎<br>餞<br>店<br>延<br>汀<br>精 | 瑛<br>鋑<br>漸<br>定<br>正<br>鋌 | 田<br>鋼<br>点<br>幀<br>汀<br>艇 | 甸<br>電<br>粘<br>庭<br>淀<br>訂 | 畑<br>顚<br>霑<br>廷<br>淨<br>諄 | 顚<br>顫<br>鮎<br>征<br>渟<br>貞 | 笺<br>餞<br>點<br>情<br>湞<br>鄭 | 箋<br>切<br>接<br>挺<br>遭<br>酊 | 箭<br>截<br>摺<br>政<br>瀞<br>釘 | 篆<br>折<br>蝶<br>丁<br>整<br>鉦 | 緾<br>浙<br>丁<br>井<br>旌<br>鋌 | 詮<br>癜<br>井<br>町<br>晶<br>鋌 | 輾<br>節<br>亭<br>最<br>晴<br>錠 | 轉<br>絶<br>停<br>征<br>碇<br>霆 | 釧<br>占<br>偵<br>楨<br>楨<br>靖 |
| f0 | a0<br>b0<br>c0<br>d0<br>e0<br>f0 | <br>臍<br>弔<br>爪<br>調<br>拙 | 靜<br>薺<br>彫<br>璪<br>趙<br>猝 | 頂<br>製<br>措<br>眺<br>躁<br>倅 | 鼎<br>諸<br>操<br>祖<br>造<br>宗 | 制<br>啼<br>早<br>胙<br>遭<br>從 | 劑<br>醍<br>晁<br>祚<br>釣<br>悰 | 啼<br>除<br>曺<br>稠<br>阻<br>憁 | 堤<br>際<br>曹<br>窕<br>雕<br>悰 | 帝<br>霽<br>朝<br>稠<br>鳥<br>棕 | 弟<br>題<br>條<br>粗<br>族<br>淙 | 悌<br>齊<br>棗<br>精<br>簇<br>琮 | 提<br>俎<br>棗<br>組<br>足<br>綜 | 梯<br>兆<br>槽<br>肇<br>鏃<br>綜 | 濟<br>潤<br>潮<br>漕<br>曾<br>縱 | 祭<br>助<br>藻<br>蚤<br>曾<br>腫 | 第<br>嘲<br>燥<br>詔<br>卒<br>踵 |

FIG. 6R

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| f1 | a0<br>b0<br>c0<br>d0<br>e0<br>f0 | <br>肯<br>妵<br>酒<br>焌<br>汁 | 踪<br>呪<br>珠<br>鑄<br>晙<br>茸 | 踵<br>周<br>疇<br>駐<br>竣<br>增 | 鍾<br>噅<br>燾<br>竹<br>蠢<br>憎 | 鐘<br>奏<br>村<br>粥<br>逡<br>曾 | 佐<br>宙<br>紬<br>俊<br>遵<br>拯 | 坐<br>州<br>綢<br>儁<br>雋<br>烝 | 左<br>廚<br>舟<br>准<br>駿<br>甑 | 座<br>壹<br>蛛<br>埈<br>芚<br>症 | 挫<br>朱<br>註<br>寯<br>中<br>橧 | 罪<br>柱<br>誅<br>峻<br>仲<br>蒸 | 主<br>株<br>走<br>晙<br>衆<br>證 | 住<br>注<br>躊<br>樽<br>重<br>贈 | 侏<br>洲<br>輳<br>浚<br>即<br>之 | 做<br>湊<br>週<br>準<br>櫛<br>只 | 姝<br>澍<br>酎<br>濬<br>楫<br> |
| f2 | a0<br>b0<br>c0<br>d0<br>e0<br>f0 | <br>洷<br>遲<br>津<br>畛<br>疾 | 叱<br>知<br>直<br>溱<br>賑<br>秩 | 地<br>砥<br>稙<br>珍<br>畛<br>窒 | 址<br>祉<br>植<br>瑨<br>辰<br>膣 | 志<br>祗<br>稷<br>瑱<br>進<br>蛭 | 持<br>紙<br>織<br>昣<br>鎭<br>質 | 指<br>肢<br>職<br>唇<br>陣<br>跌 | 摯<br>脂<br>唇<br>嗔<br>陳<br>迭 | 支<br>至<br>塵<br>壼<br>震<br>斟 | 旨<br>芝<br>嗔<br>眞<br>侄<br>朕 | 智<br>正<br>振<br>瞋<br>叱<br>什 | 枝<br>蜘<br>搢<br>秦<br>姪<br>執 | 枳<br>誌<br>晋<br>縉<br>嫉<br>潗 | 止<br>識<br>晉<br>臻<br>帙<br>緝 | 池<br>贄<br>榛<br>蔯<br>桎<br>輯 | 沚<br>趾<br>珍<br>畛<br>瓆<br> |
| f3 | a0<br>b0<br>c0<br>d0<br>e0<br>f0 | <br>劄<br>璨<br>僭<br>彰<br>償 | 鏶<br>茶<br>窶<br>參<br>愴<br>埰 | 集<br>蹉<br>篡<br>塹<br>敞<br>寀 | 徵<br>車<br>簒<br>慘<br>昌<br>寨 | 懲<br>遮<br>瑳<br>憯<br>昶<br>彩 | 澄<br>捉<br>贊<br>饞<br>暢<br>採 | 且<br>搾<br>讚<br>斬<br>槍<br>砦 | 侘<br>窄<br>贊<br>站<br>滄<br>綵 | 借<br>錯<br>鑽<br>讒<br>漲<br>菜 | 叉<br>整<br>餐<br>倉<br>猖<br>蔡 | 嗟<br>鮏<br>饌<br>饌<br>瘡<br>采 | 嗟<br>撰<br>刹<br>倡<br>窓<br>釵 | 差<br>澯<br>察<br>創<br>脹<br>冊 | 次<br>燦<br>擦<br>唱<br>槍<br>柵 | 此<br>璨<br>札<br>娼<br>菖<br>策 | 磋<br>粲<br>紮<br>廠<br>蒼<br> |
| f4 | a0<br>b0<br>c0<br>d0<br>e0<br>f0 | <br>瘠<br>薦<br>轍<br>牒<br>諂 | 責<br>脊<br>賤<br>鐵<br>疊<br>涕 | 凄<br>蹠<br>踐<br>僉<br>睫<br>滯 | 妻<br>陟<br>遷<br>尖<br>諜<br>締 | 倭<br>隻<br>釧<br>沾<br>貼<br>諦 | 處<br>仟<br>闡<br>添<br>軛<br>逮 | 個<br>千<br>阡<br>甛<br>廳<br>遞 | 刺<br>喘<br>舔<br>瞻<br>聽<br>體 | 剔<br>天<br>轍<br>瞻<br>菁<br>初 | 尺<br>川<br>凸<br>籤<br>請<br>剃 | 憾<br>擅<br>哲<br>詹<br>青<br>哨 | 戚<br>泉<br>喆<br>謅<br>鯖<br>憔 | 拓<br>淺<br>徹<br>堞<br>切<br>抄 | 擲<br>玔<br>撤<br>妾<br>切<br>招 | 斥<br>穿<br>澈<br>帖<br>剃<br>梢 | 滌<br>舛<br>綴<br>捷<br>刹<br> |
| f5 | a0<br>b0<br>c0<br>d0<br>e0<br>f0 | <br>貂<br>塚<br>椎<br>鎚<br>春 | 椒<br>超<br>寵<br>楸<br>雛<br>椿 | 楚<br>酢<br>忠<br>樞<br>鶵<br>瑃 | 燋<br>醋<br>衷<br>湫<br>鷲<br>出 | 炒<br>醮<br>悤<br>皺<br>丑<br>朮 | 焦<br>促<br>總<br>秋<br>畜<br>融 | 礁<br>囑<br>聰<br>芻<br>祝<br>充 | 礎<br>燭<br>蔥<br>諏<br>竺<br>忠 | 秒<br>矗<br>聰<br>趨<br>筑<br>冲 | 稍<br>蜀<br>撮<br>催<br>築<br>蟲 | 肖<br>寸<br>催<br>崔<br>縮<br>衝 | 岬<br>忖<br>最<br>鄒<br>蓄<br>衷 | 苕<br>村<br>會<br>醜<br>蹙<br>悴 | 草<br>邨<br>墜<br>錐<br>蹴<br>萃 | 蕉<br>叢<br>推<br>錘<br>逐<br> |

FIG. 6S

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| f6 | a0 | | 贅 | 取 | 吹 | 嘴 | 娶 | 就 | 炊 | 翠 | 聚 | 脆 | 臭 | 趣 | 醉 | 驟 | 駑 |
|  | b0 | 側 | 仄 | 廁 | 惻 | 測 | 層 | 侈 | 値 | 置 | 峙 | 幟 | 恥 | 梔 | 治 | 淄 | 熾 |
|  | c0 | 痔 | 痴 | 癡 | 稚 | 稺 | 緇 | 緻 | 置 | 致 | 蚩 | 輜 | 雉 | 馳 | 齒 | 則 | 勅 |
|  | d0 | 飭 | 親 | 七 | 柒 | 漆 | 侵 | 寢 | 枕 | 沈 | 浸 | 琛 | 砧 | 針 | 鍼 | 蟄 | 秤 |
|  | e0 | 稱 | 快 | 他 | 咤 | 唾 | 墮 | 妥 | 惰 | 打 | 拖 | 朶 | 楕 | 舵 | 陀 | 馱 | 駝 |
|  | f0 | 倬 | 卓 | 啄 | 坼 | 度 | 托 | 拓 | 擢 | 晫 | 柝 | 濁 | 濯 | 琢 | 琸 | 託 |  |
| f7 | a0 | | 鐸 | 呑 | 嘆 | 坦 | 彈 | 憚 | 歎 | 灘 | 炭 | 綻 | 誕 | 奪 | 脫 | 探 | 眈 |
|  | b0 | 耽 | 貪 | 塔 | 搭 | 榻 | 宕 | 帑 | 湯 | 糖 | 蕩 | 兌 | 台 | 太 | 怠 | 態 | 殆 |
|  | c0 | 汰 | 泰 | 笞 | 胎 | 苔 | 跆 | 邰 | 颱 | 宅 | 擇 | 澤 | 撑 | 攄 | 兎 | 吐 | 土 |
|  | d0 | 討 | 慟 | 桶 | 洞 | 痛 | 筒 | 統 | 通 | 堆 | 槌 | 腿 | 褪 | 退 | 頹 | 偸 | 套 |
|  | e0 | 妬 | 投 | 透 | 鬪 | 慝 | 特 | 闖 | 坡 | 婆 | 巴 | 把 | 播 | 擺 | 杷 | 波 | 派 |
|  | f0 | 爬 | 琶 | 破 | 罷 | 芭 | 跛 | 頗 | 判 | 坂 | 板 | 版 | 瓣 | 販 | 辦 | 鈑 |  |
| f8 | a0 | | 阪 | 八 | 叭 | 捌 | 佩 | 唄 | 悖 | 敗 | 沛 | 浿 | 牌 | 狽 | 稗 | 覇 | 貝 |
|  | b0 | 彭 | 澎 | 烹 | 膨 | 愎 | 便 | 偏 | 扁 | 片 | 篇 | 編 | 翩 | 遍 | 鞭 | 騙 | 貶 |
|  | c0 | 坪 | 平 | 枰 | 萍 | 評 | 吠 | 嬖 | 幣 | 廢 | 弊 | 斃 | 肺 | 蔽 | 閉 | 陛 | 佈 |
|  | d0 | 包 | 匍 | 匏 | 咆 | 哺 | 圃 | 布 | 怖 | 拋 | 抱 | 捕 | 暴 | 泡 | 浦 | 疱 | 砲 |
|  | e0 | 胞 | 脯 | 苞 | 葡 | 蒲 | 袍 | 褒 | 逋 | 鋪 | 鮑 | 幅 | 暴 | 曝 | 瀑 | 爆 |  |
|  | f0 | 輻 | 俵 | 剽 | 彪 | 慓 | 杓 | 標 | 漂 | 瓢 | 票 | 表 | 豹 | 飇 | 飄 | 驃 |  |
| f9 | a0 | | 品 | 稟 | 楓 | 諷 | 豊 | 風 | 馮 | 彼 | 披 | 疲 | 皮 | 被 | 避 | 陂 | 匹 |
|  | b0 | 弼 | 必 | 泌 | 珌 | 畢 | 疋 | 筆 | 苾 | 馝 | 乏 | 逼 | 下 | 何 | 厦 | 夏 | 廈 |
|  | c0 | 昰 | 河 | 瑕 | 荷 | 蝦 | 賀 | 遐 | 霞 | 鰕 | 壑 | 學 | 虐 | 謔 | 鶴 | 寒 | 恨 |
|  | d0 | 悍 | 旱 | 汗 | 漢 | 澣 | 瀚 | 罕 | 翰 | 閑 | 閒 | 限 | 韓 | 割 | 轄 | 函 | 含 |
|  | e0 | 咸 | 啣 | 喊 | 檻 | 涵 | 緘 | 艦 | 銜 | 陷 | 鹹 | 合 | 哈 | 盒 | 蛤 | 閤 | 闔 |
|  | f0 | 陜 | 亢 | 伉 | 姮 | 嫦 | 巷 | 恒 | 抗 | 杭 | 桁 | 沆 | 港 | 缸 | 肛 | 航 |  |
| fa | a0 | | 行 | 降 | 項 | 亥 | 偕 | 咳 | 垓 | 奚 | 孩 | 害 | 懈 | 楷 | 海 | 瀣 | 蟹 |
|  | b0 | 解 | 該 | 諧 | 邂 | 駭 | 骸 | 劾 | 核 | 倖 | 幸 | 杏 | 荇 | 行 | 享 | 向 | 嚮 |
|  | c0 | 珦 | 鄕 | 響 | 餉 | 饗 | 香 | 噓 | 墟 | 虛 | 許 | 憲 | 櫶 | 獻 | 軒 | 歇 | 險 |
|  | d0 | 驗 | 奕 | 爀 | 赫 | 革 | 俔 | 峴 | 弦 | 懸 | 晛 | 泫 | 炫 | 玄 | 玹 | 現 | 眩 |
|  | e0 | 睍 | 絃 | 絢 | 縣 | 舷 | 衒 | 見 | 賢 | 鉉 | 顯 | 孑 | 穴 | 血 | 頁 | 嫌 | 俠 |
|  | f0 | 協 | 夾 | 峽 | 挾 | 浹 | 狹 | 脅 | 脇 | 莢 | 鋏 | 頰 | 亨 | 兄 | 刑 | 型 |  |

FIG. 6T

| UPPER | LOWER | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| fb | a0<br>b0<br>c0<br>d0<br>e0<br>f0 | 馨<br>岵<br>琄<br>鎬<br>弘 | 形<br>兮<br>弧<br>瑚<br>護<br>氶 | 洞<br>彗<br>戶<br>瓠<br>顥<br>泓 | 熒<br>惠<br>岯<br>皓<br>惑<br>洪 | 瀅<br>戀<br>昊<br>祜<br>或<br>烘 | 瀣<br>嘩<br>皓<br>糊<br>酷<br>紅 | 炯<br>蕙<br>磎<br>縞<br>婚<br>虹 | 熒<br>醯<br>浩<br>胡<br>昏<br>江 | 珩<br>鞋<br>湨<br>蘆<br>混<br>鴻 | 瑩<br>乎<br>湖<br>葫<br>渾<br>化 | 荊<br>互<br>澔<br>蒿<br>琿<br>和 | 螢<br>呼<br>濠<br>虎<br>魂<br>嬅 | 衡<br>壕<br>濩<br>號<br>忽<br>樺 | 逈<br>壺<br>濩<br>蝴<br>惚<br>火 | 邢<br>壺<br>灝<br>護<br>笏<br>畵 | 鎣<br>好<br>狐<br>豪<br>哄 |
| fc | a0<br>b0<br>c0<br>d0<br>e0<br>f0 | <br>喚<br>活<br>湟<br>徊<br>賄 | 禍<br>奐<br>滑<br>滉<br>恢<br>劃 | 禾<br>宦<br>猾<br>潢<br>悔<br>獲 | 花<br>幻<br>豁<br>煌<br>懷<br>宖 | 華<br>患<br>谹<br>璜<br>晦<br>橫 | 話<br>換<br>闊<br>皇<br>會<br>鐄 | 譁<br>歡<br>凰<br>篁<br>檜<br>哮 | 貨<br>院<br>恍<br>簧<br>淮<br>嚆 | 靴<br>桓<br>徨<br>荒<br>澮<br>孝 | 廓<br>渙<br>惶<br>蝗<br>潰<br>效 | 擴<br>煥<br>愰<br>遑<br>獪<br>斅 | 攫<br>環<br>慌<br>隍<br>繪<br>曉 | 確<br>紈<br>晃<br>黃<br>膾<br>梟 | 碻<br>還<br>晄<br>匯<br>茴<br>涍 | 穫<br>驩<br>榥<br>回<br>蛔<br>淆 | 丸<br>鰥<br>況<br>廻<br>誨 |
| fd | a0<br>b0<br>c0<br>d0<br>e0<br>f0 | <br>珝<br>萱<br>麜<br>紇<br>嬉 | 爻<br>逅<br>卉<br>恤<br>訖<br>希 | 肴<br>勖<br>喉<br>譎<br>欠<br>熹 | 酵<br>勛<br>毀<br>鷸<br>欽<br>憙 | 曉<br>塤<br>彙<br>兇<br>飮<br>戲 | 侯<br>薰<br>徽<br>凶<br>吸<br>晞 | 候<br>煮<br>揮<br>匈<br>恰<br>曦 | 厚<br>熏<br>暉<br>洶<br>洽<br>熙 | 后<br>燻<br>煇<br>胸<br>翕<br>熺 | 吼<br>薰<br>諱<br>黑<br>興<br>熺 | 喉<br>訓<br>輝<br>昕<br>僖<br>犧 | 嗅<br>暈<br>麾<br>欣<br>凞<br>禧 | 帿<br>薨<br>休<br>炘<br>喜<br>稀 | 後<br>喧<br>携<br>痕<br>噫<br>義 | 朽<br>喧<br>烋<br>吃<br>囍<br>詰 | 煦<br>煊<br>畦<br>屹<br>姬 |
| fe | a0<br>b0<br>c0<br>d0<br>e0<br>f0 | USER'S DEFINITION REGION FOR CHINESE CHARACTER | | | | | | | | | | | | | | | |
| ff | a0<br>b0<br>c0<br>d0<br>e0<br>f0 | NOT IN USE | | | | | | | | | | | | | | | |

FIG. 10

1 COLUMN　　　　　　　　　　　　　　　　　　18 COLUMN

|  |  |  |  |  |  |  |  |  |  |  |  |  |  |  |  |  |  |
|--|--|--|--|--|--|--|--|--|--|--|--|--|--|--|--|--|--|
|  |  |  |  |  |  |  |  |  |  |  |  |  |  |  |  |  |  | ←1 ROW
|  |  |  |  |  |  |  |  |  |  |  |  |  |  |  |  |  |  | ←2 ROW

← 1 ROW
← 2 ROW
← 3 ROW
← 4 ROW
← 5 ROW
← 6 ROW
← 7 ROW
← 8 ROW
← 9 ROW

다음은 ROLL 표시법의 데이터 전송에 ← 10 ROW

FIG. 11

1 COLUMN　　　　　　　　　　　　　　　　　　18 COLUMN

← 1 ROW
← 2 ROW
← 3 ROW
← 4 ROW
← 5 ROW
← 6 ROW
← 7 ROW
← 8 ROW

다음은 ROLL 표시법의 데이터 전송에 ← 9 ROW
대한 예를 보인 것이다. ← 10 ROW

FIG. 12

1 COLUMN ↑          18 COLUMN ↑

| | | | | | | | | | | | | | | | | | | |
|---|---|---|---|---|---|---|---|---|---|---|---|---|---|---|---|---|---|---|
| | | | | | | | | | | | | | | | | | | ←1 ROW |
| | | | | | | | | | | | | | | | | | | ←2 ROW |
| | | | | | | | | | | | | | | | | | | ←3 ROW |
| | | | | | | | | | | | | | | | | | | ←4 ROW |
| | | | | | | | | | | | | | | | | | | ←5 ROW |
| | | | | | | | | | | | | | | | | | | ←6 ROW |
| | | | | | | | | | | | | | | | | | | ←7 ROW |
| | | | | | | | | | | | | | | | | | | ←8 ROW |
| 대 | 한 | 예 | 를 | | 보 | 인 | 것 | 이 | 다 | | | | | | | | | ←9 ROW |
| 또 | 한 | | 줄 | 을 | R | OL | L- | UP | 시 | 킨 | 다 | | | | | | | ←10 ROW |

FIG. 13

1 COLUMN ↑          18 COLUMN ↑

| | | | | | | | | | | | | | | | | | | |
|---|---|---|---|---|---|---|---|---|---|---|---|---|---|---|---|---|---|---|
| | | | | | | | | | | | | | | | | R | | ←1 ROW |
| | | | | | | | | | | | | | | | | O | 이 | ←2 ROW |
| | | | | | | | | | | | | | | | | L | 번 | ←3 ROW |
| | | | | | | | | | | | | | | | | L | 에 | ←4 ROW |
| | | | | | | | | | | | | | | | | | 는 | ←5 ROW |
| | | | | | | | | | | | | | | | | 표 | | ←6 ROW |
| | | | | | | | | | | | | | | | | 기 | 세 | ←7 ROW |
| | | | | | | | | | | | | | | | | 의 | 로 | ←8 ROW |
| | | | | | | | | | | | | | | | | | 쓰 | ←9 ROW |
| | | | | | | | | | | | | | | | | 예 | 기 | ←10 ROW |

FIG. 14

| | | | | | | | | | | | | | | | 를 | R | |
|---|---|---|---|---|---|---|---|---|---|---|---|---|---|---|---|---|---|
| | | | | | | | | | | | | | | | | O | |
| | | | | | | | | | | | | | | | 보 | L | |
| | | | | | | | | | | | | | | | 인 | L | |
| | | | | | | | | | | | | | | | | | |
| | | | | | | | | | | | | | | | 것 | 표 | |
| | | | | | | | | | | | | | | | 이 | 기 | |
| | | | | | | | | | | | | | | | 다 | 의 | |
| | | | | | | | | | | | | | | | . | | |
| | | | | | | | | | | | | | | | | 예 | |

1 COLUMN ... 18 COLUMN
←1 ROW, ←2 ROW, ←3 ROW, ←4 ROW, ←5 ROW, ←6 ROW, ←7 ROW, ←8 ROW, ←9 ROW, ←10 ROW

FIG. 15

1 COLUMN ... 18 COLUMN

Row 9: 다 음 은  R OL L  표 시 법 의  데 이 터  전 송 에
Row 10: 대 한  예 를  보 인  것 이 다

←1 ROW through ←10 ROW

FIG. 16

1 COLUMN          18 COLUMN

←1 ROW
←2 ROW
←3 ROW
←4 ROW
←5 ROW
←6 ROW
←7 ROW
←8 ROW
←9 ROW 대 한 예 를 보 인 것 이 다.
←10 ROW 또 한 줄 를 R OL L- UP 시 킨 다

FIG. 17

1 COLUMN          18 COLUMN

←1 ROW
←2 ROW
←3 ROW
←4 ROW
←5 ROW
←6 ROW
←7 ROW
←8 ROW
←9 ROW 대 한 예 를 보 인 것 이 다
←10 ROW 또 한 줄 를 R OL L- UP 시 킨 다

SOFT SCROLLING METHOD AND APPARATUS OF CLOSED-CAPTION WORDS

BACKGROUND OF THE INVENTION

1. Field of the Invention

The present invention relates to a soft scrolling method and apparatus of closed-caption words, and more particularly, to a soft scrolling method of closed-caption words whereby character and control codes are encoded in a television signal to be transmitted as a caption broadcasting signal, and then received to be displayed on a screen of a television receiver by selection of a viewer.

2. Description of the Related Art

The caption broadcasting system in television broadcasting can be classified into an open caption system for displaying a caption of emergency news, announcements, etc., on a television screen by selection of a broadcaster by superimposing the caption signal in an active period of a television signal, and a closed caption system for displaying a caption of words on the screen by selection of a viewer by encoding the caption signal in a non-active period, i.e., in a vertical blanking interval of the television signal.

The closed-caption broadcasting has been carried out in the United States since 1978 for people who have difficulty in hearing and cannot recognize the words of the scene without sign language. The closed-caption broadcasting is also useful in studying a foreign language.

The U.S. Pat. No. 5,294,982 issued on March, 1994 discloses a closed-caption broadcasting system suitable for displaying Roman characters and syllable characters. Especially, captioning of the syllable characters such as Korean is explained in detail in this patent. According to this patent, in order to broadcast Hangul (Korean alphabet) as a closed-caption, one Hangul character is separated into initial, medial, and final consonant phonemes and ASCII (American Standard Code for Information Interchange) codes corresponding to the respective consonant phonemes are transmitted. In a receiving part, the ASCII codes are received and decoded, and then the initial, medial, and final consonant phonemes are mapped to form and display the Hangul character.

However, according to this conventional Hangul closed-captioning system, since at least two or three bytes of data should be used for representing one Hangul character, the transmission speed and the display speed thereof become lowered. Also, its decoding process becomes complicated because the position of one Hangul character is searched by combination of three or four bytes of data, causing the cost of a caption decoder to increase.

Also, the conventional Hangul closed-captioning system has difficulty in simultaneously displaying Chinese characters, Hangul, and Japanese, and in simultaneously displaying English, Russian and Greek, as well as in displaying special symbols.

Also, since a control code is required in case of displaying word information between additional information and then displaying additional information again, there is no independence between the word information and additional information, and the control system for discriminating a display mode of the word information becomes complicated. If the display mode control code is not received at the start point of the receiving device's operation, the word information cannot be displayed until a next control code is received.

Further, since the conventional system has been developed based on the television broadcasting environment in the United States, it shows an inferior receiving state in the geographic setting of Korea that has mountainous districts over 70%, thereby deteriorating the quality of the caption display.

Also, in displaying the caption words on the screen of the receiver, since the displayed caption words are rolled up or rolled down row by row, they appear to lack visual variety.

Meanwhile, related arts regarding the closed-caption broadcasting and receiving apparatuses are disclosed in U.S. Pat. Nos. 5,327,176, 4,310,854, 5,347,365, 5,249,050, 5,374,960, and 5,315,386, and Japanese Patent Laid-open Nos. 6-165065 and 6-165064.

SUMMARY OF THE INVENTION

It is an object of the present invention to solve the problems involved in the prior art, and to provide a soft scrolling method of closed-caption words whereby the scrolling of the closed-caption words on the screen appears smooth and natural.

In order to achieve the above and other objects, the present invention provides a soft scrolling method of closed-caption words whereby caption information encoded in a horizontal line of a field of a television broadcasting signal, which does not affect the broadcasting signal, is displayed on a display screen of a receiver by selection of a viewer, the soft scrolling method comprising the steps of discriminating whether or not a present mode is a soft scroll mode; reading out character data for one line or for several lines from a display memory in which decoded caption information is stored at predetermined intervals into which a one-row scrolling time is equally divided if the present mode is discriminated as the soft scroll mode; and converting the read-out character data into a video signal to display the video signal on the display screen.

BRIEF DESCRIPTION OF THE DRAWINGS

The above object, other features and advantages of the present invention will become more apparent by describing the preferred embodiments thereof with reference to the accompanying drawings, in which:

FIG. 5 is a view explaining the control code according to the present invention.

FIGS. 6A to 6T are views illustrating Hangul completion type code tables explaining the structure of the character code according to the present invention.

FIGS. 10 to 12 are views explaining the scroll function of a caption displayed on the screen by horizontal writing according to the present invention.

FIGS. 13 and 14 are views explaining the scroll function of a caption displayed on the screen by vertical writing according to the present invention.

FIGS. 15 to 17 are views explaining the soft scrolling function of the caption words displayed on the screen according to the present invention.

DETAILED DESCRIPTION OF THE PREFERRED EMBODIMENTS

Figure 1:
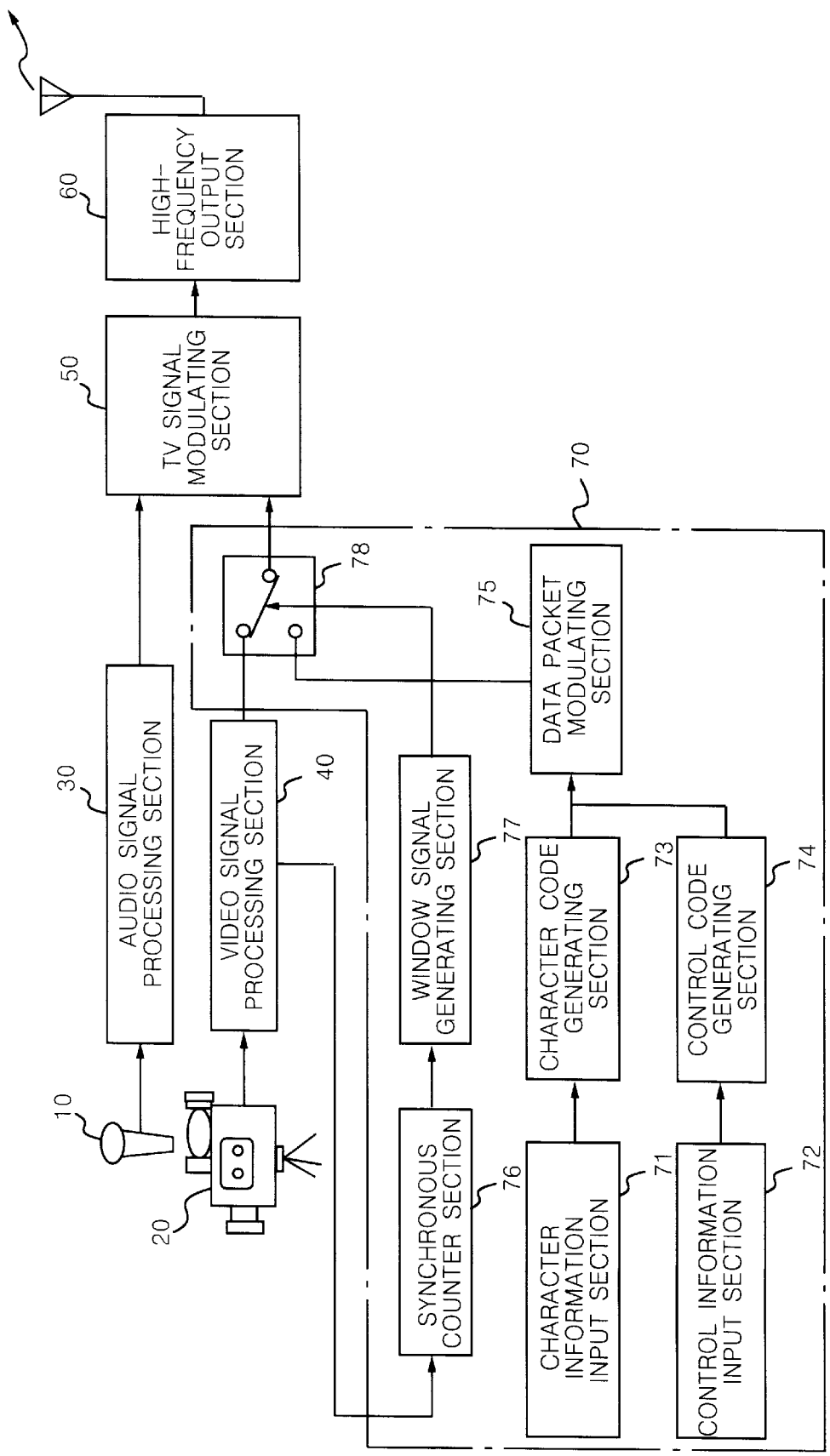
FIG. 1 is a block diagram of a television broadcasting system incorporating the viewer's selection type caption broadcasting apparatus according to the present invention.

FIG. 1 shows the structure of a television broadcasting system incorporating a viewer's selection type caption broadcasting apparatus according to the present invention.

Referring to FIG. 1, an audio signal inputted through a microphone 10 is mixed and amplified by an audio signal processing section 30 and then provided to a television (TV) signal modulating section 50. A video signal inputted through a video camera 20 is amplified and edited by a video signal processing section 40 and then provided to the TV signal modulating section 50. The TV signal modulating section 50 frequency-modulates the audio signal, amplitude-modulates the video signal by vestigial-sideband modulation, and frequency-multiplexes and frequency-transits the amplitude-modulated (AM) signal and the frequency-modulated (FM) signal to produce a high-frequency signal. The high frequency signal is then amplified by a high-frequency output section 60 to be transmitted through an antenna as a television signal.

Word information related to the television screen or additional information such as emergency news, announcements, etc., is inputted to a caption encoding block 70 through a character information input section 71. Control information for the caption control is inputted through a control information input section 72. The character information input section 71 includes a keyboard for inputting characters of Hangul, English, Chinese, Japanese, etc., and special characters, and outputs syllable characters, for example, a 2-byte Hangul completion type code (KSC 5901) in response to the input character information. The control information input section 72 includes keypads such as a mode selection key, function selection key, etc., and outputs a 7-bit binary code in response to the input control information.

A character code generating section 73 uses the MSB (most significant bit) of each byte of the input 2-byte character code as a caption word/additional information flag, and generates a data packet of an 18-bit character code by replacing the MSB by "O" in case of the additional information and then adding a parity bit to each byte.

A control code generating section 74 generates a data packet of an 18-bit control code by dividing the input 7-bit control information into upper 4 bits and lower 3 bits, creating an upper byte by adding to the upper 4 bits a parity bit, control code discriminating bits of 2 bits, and a word/addition flag, creating a lower byte by adding to the lower 3 bits a first parity bit, a second parity bit, control code discriminating bits of 2 bits, and a caption word/additional information flag, and then adding a parity bit to each created byte. A detailed explanation about the data packet will follow.

A data packet modulating section 75 modulates the data packet generated by the character code generating section 73 or the control code generating section 74 by digital modulation.

A synchronous counter section 76 receives a sync signal provided from the video signal processing section 40, and is reset by a vertical sync signal. The synchronous counter section 76 counts a horizontal sync signal to select the 262nd scanning line of an odd field and the 525th scanning line of an even field.

A window signal generating section 77 receives the counted value of the synchronous counter section 76 and generates a window signal, which is a switching control signal of a switching section 78 for superimposing the caption signal in specific lines, for example, in the 262nd and 525th scanning lines of the video signal outputted from the video signal processing section 40.

Figure 2:
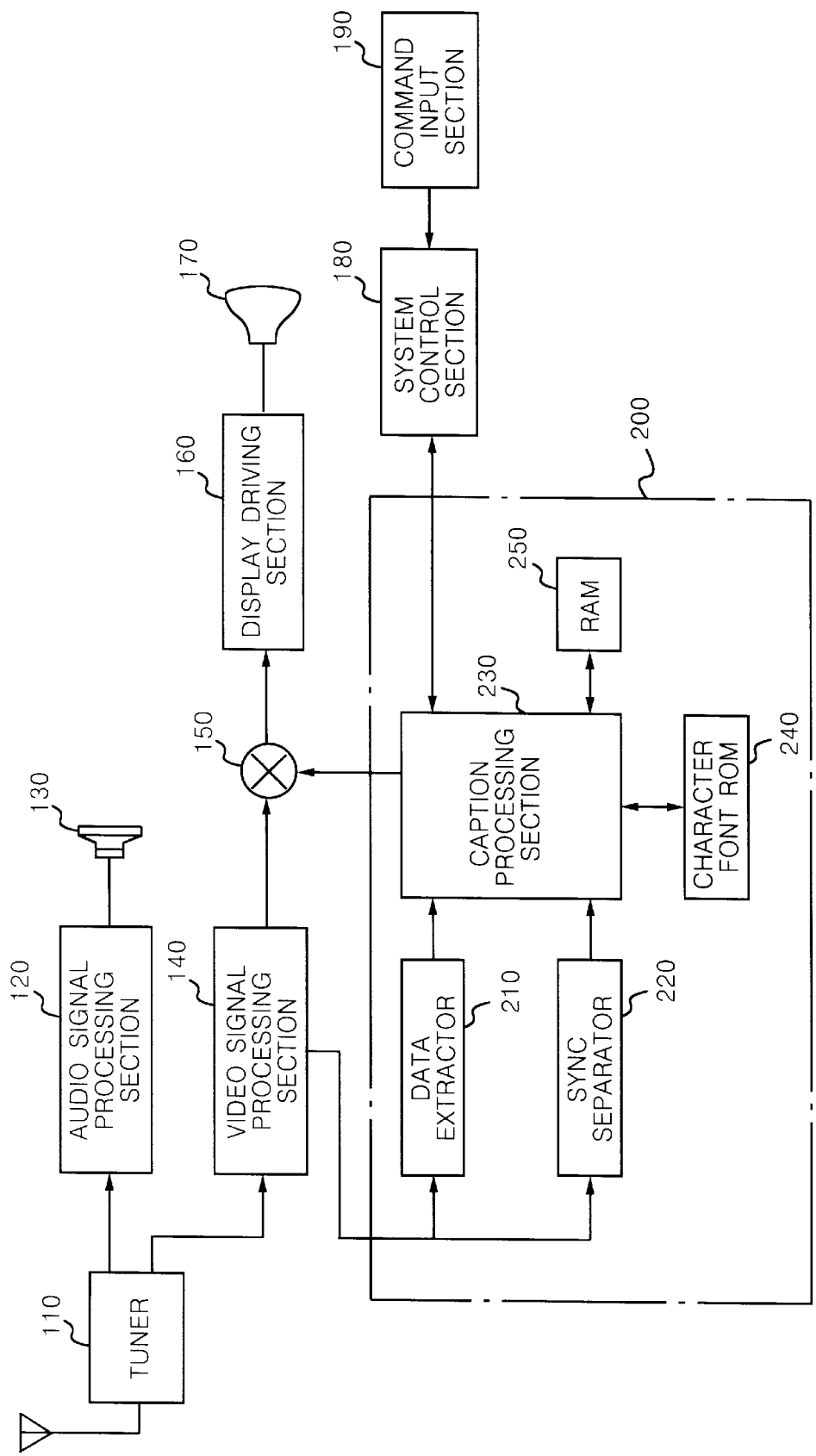
FIG. 2 is a block diagram of a television receiver incorporating the viewer's selection type caption broadcast receiving apparatus according to the present invention.

FIG. 2 shows the structure of a television receiver incorporating the viewer's selection type caption broadcast receiving apparatus according to the present invention.

Referring to FIG. 2, a tuner 110 selects a television signal of a selected channel among high frequency signals received through an antenna, and demodulates the selected television signal to output an audio signal and a video signal. The audio signal is equalized and amplified by the audio signal processing section 120 and then outputted to a loudspeaker 130. The video signal is luminance-processed and chrominance-processed by the video signal processing section 140 to be outputted as a composite video signal. The composite video signal is provided to a display driving section 160 through a mixer 150. The display driving section 160 drives a CRT (cathode ray tube) 170 in response to the composite video signal to display a corresponding image on the screen of the CRT 170. In a caption decoding block 200, the video signal is converted into a digital signal through a data extractor 210, and the digital signal is inputted to a caption processing section 230. The data extractor 210 may comprise an analog-to-digital (A/D) converter, or a slice integrated circuit. At the same time, a sync separator 220 separates vertical and horizontal sync signals from the video signal, and outputs the sync signals to the caption processing section 230.

Figure 18:
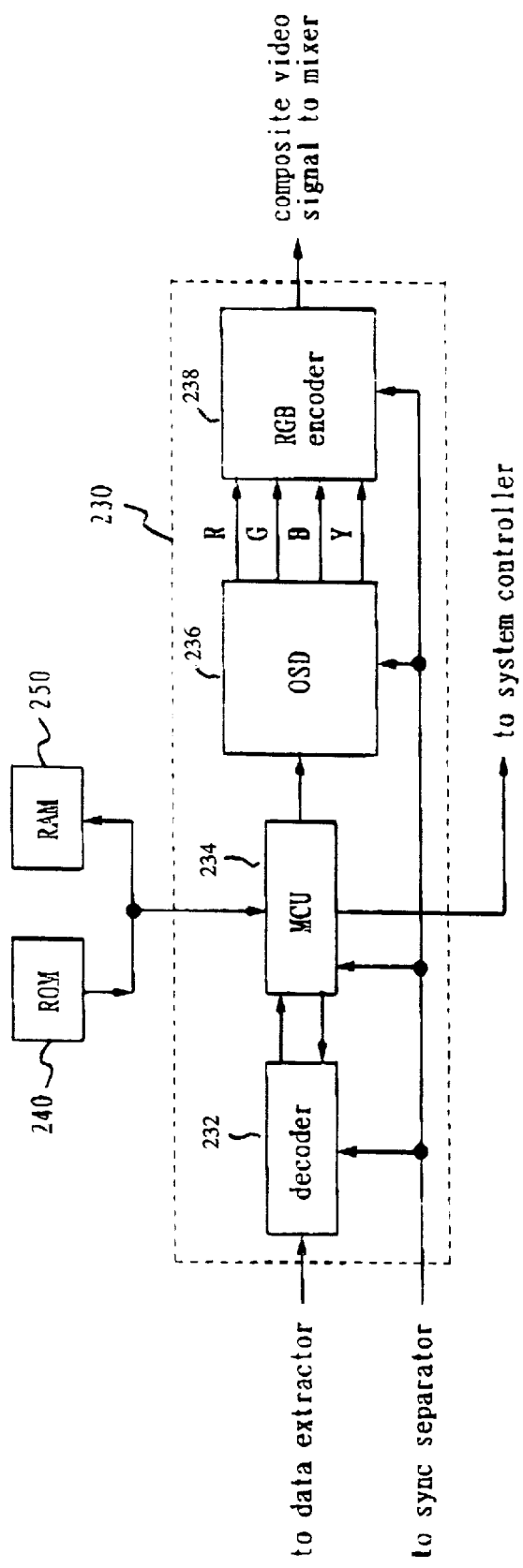
FIG. 18 is a block diagram of a caption processing section shown in FIG. 2.

As shown in FIG. 18, caption processing section 230 includes a decoder 232, microcomputer 234, on-screen generator 236, and RGB (red, green, blue) encoder 238. The decoder 232, which comprises an ASIC chip, analyzes the data extracted by the data extractor 210, detects the existence of error in the data, and stores and updates the additional information. The microcomputer 234 performs data communications with a system control section 180, and analyzes the data provided from the decoder 232. If the data is the control code, the microcomputer 234 performs the corresponding control process, and stores in a RAM 250 values mating with addresses of a character font ROM 240 which uses the 16-bit Hangul completion type code. The on-screen generator 236 generates Y (luminance), R (red), G (green), and B (blue) signals in accordance with the data read out from the character font ROM 240 which is addressed by the values stored in the RAM 250. The RGB encoder 238 includes an encoder for producing a composite video signal according to the Y, R, G, and B signals. The composite video signal is provided to the mixer 150.

The system control section 180 transfers a closed-caption soft control command inputted through a command input section 190 to the caption processing section 230, and thus the caption processing section 230 reads out the character data for one line or for several lines from the RAM 250 at predetermined intervals into which a one-row scrolling time is equally divided to output the read-out character data accordingly.

The command input section 190 may comprise a remote controller and/or a key input section for inputting the following command functions. The receiver performs at least the following caption-related functions inputted by the remote controller. It is also possible to add other functions other than the following functions.

display of reception or non-reception of a caption packet in a field display of the receiving sensitivity of caption display of existence or nonexistence of two languages display of reception or non-reception of additional information on/off function of caption words on/off function of additional information holding function of additional information page selection function of caption words of two languages prevention function of vertical writing soft scrolling function If a soft scroll control code is provided, the character data is read out and outputted for one line or for several lines from the RAM 250 at predetermined intervals into which a one-row scrolling time is equally divided in response to the soft scroll control code.

The character font ROM 240 stores therein character information of a bit-map type which corresponds to the KSC 5601 code values of the Hangul completion type.

The detailed structure of a caption signal for use in the caption broadcasting and receiving systems as described above will be explained.

In Korea, an M-NTSC type television signal having 525 scanning lines, 60 fields per second, has been used as a broadcasting signal. It is prescribed that vertical blanking intervals exist in the range of 1st to 20th scanning lines in the odd fields, and in the range of 264th to 282nd scanning lines in the even fields.

A standard of use of vertical blanking intervals has not yet been provided by organizations concerned, but ITU-R Recommendation 473-2, and FCC Report and Order 83-120 in the United States may serve as a reference.

In order to transmit caption data, one of 10th to 20th lines of vertical blanking intervals, and 21st, 262nd, and 525th lines in active video periods may be used. Also, more than one line may be used for increasing the data transmission rate or for other purposes.

The transmission bit rate of the caption data should be in the range of 447443.125 bps±125 bps, and the maximum value of the long-term variation should be less than ±196 (0.0125 bps). The caption data signal should be necessarily used only in transmitting a color television signal. Further, the transmission bit rate is determined to be ⅛ of the chrominance subcarrier frequency fsc (3579545±10Hz), and the chrominance subcarrier is frequency-synchronized with a color burst. It is preferable that the chrominance subcarrier has a continuous phase between the scanning lines. In the event that the phase of the chrominance subcarrier is discontinuous due to the picture editing, the chrominance subcarrier should be frequency -synchronized at least with the color burst of the corresponding line.

The data is modulated by digital modulation named BPSK (binary phase shift keying) or PRK (phase reversal keying) whereby a logic value of "1" is represented by one period of a sine wave having a phase of O degree and having a frequency of fsc/8 (447.443 KHz), and a logic value of "O" is represented by one period of a sine wave having a phase of 180 degrees and having a frequency of fsc/8 (447.443 KHz). The maximum range of the phase jitter is ±10. The optimum signal waveform can be changed in accordance with the frequency spectrum characteristic of a television channel, and will be prescribed hereafter. However, since severe distortion of the BPSK waveform may occur in a region where the transition of the logic value is generated due to the basic band limit frequency, the waveform, which passed through a second Butterworth filter having a cut-off frequency of 3.5 MHz and then phase-compensated, will be used in broadcasting. The impulse response of the Butterworth filter to be used is expressed by $$|H(f)| = \frac{1}{\sqrt{1+(f/fc)^4}} \text{ (where } fc = 3.5\text{MHz)}$$

Examination No.1–7 (television broadcasting station), Item 4 (teletext), Paragraph Na (superimposing position of a data line and an amplitude of a character signal), among Korean Radio Station Examination Items defines an examination method and ground. Since the waveform of the caption signal is not an NRZ (non-return-to-zero) waveform, but is a pure sine wave, it is not required to apply the above-described standard. However, in order to extend the receiving districts, considering the geographic setting of Korea having mountainous districts over 70%, the maximum value of the sine wave will be determined to be 90±5 IRE. Since the data signal may include an overshoot due to the filter pass-band characteristic, etc., though the maximum amplitude of normal data signal is defined, the maximum absolute value of the overshoot will be determined to be 5 IRE.

Figure 3:
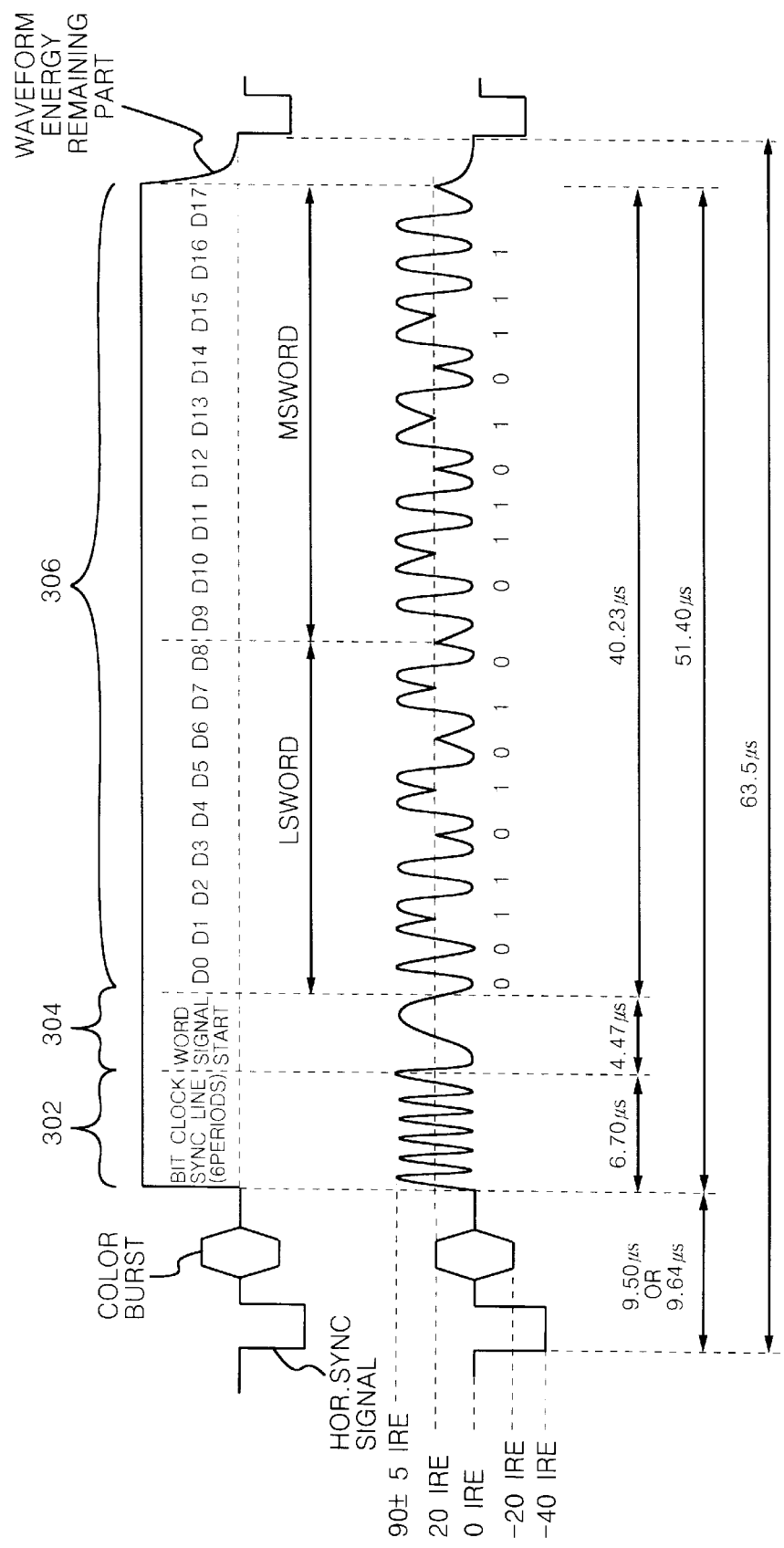
FIG. 3 is a view illustrating the structure of the caption signal according to the present invention.

Referring to FIG. 3, the data line of the caption signal includes a bit clock sync signal 302 of 6 periods, a word start signal 304, and a data line of 18 bits.

The bit clock sync signal 302, which is a sine wave of 6 periods, is extracted by the caption decoding block, and a frequency of fsc/4 (894.886 KHz) is used for reading the bit period of the 18-bit data. The bit clock sync signal 302 starts at a point which is apart from the center point OH of the falling edge of the horizontal sync signal by 9.5 μs (34 periods of the color burst) in the event that the phase of the chrominance subcarrier of the corresponding scanning line is O degree, while it starts at a point which is apart from the center point OH of the falling edge of the horizontal sync signal by 9.64 μs (34.5 periods of the color burst) in the event that the phase of the chrominance subcarrier of the corresponding scanning line is 180 degrees.

The bit clock sync signal is frequency-synchronized with the color burst of the corresponding line, and thus it can be extracted from the color burst.

The word start signal 304 has a frequency of fsc/16 (223.722 KHz), and corresponds to one period of the sine wave having a phase of 180 degrees. The word start signal 304 indicates the start of the 18-bit data packet.

The data line 306 includes 18 bits, and has a bit rate of fsc/8 (447.443 KHz). The data line 306 is modulated by BPSK modulation.

Figure 4A:
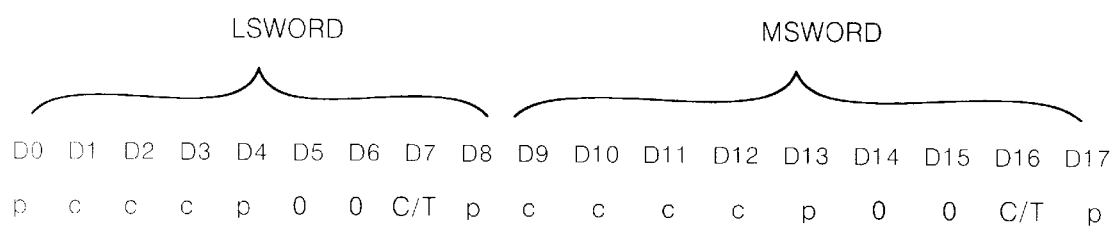
FIGS. 4A and 4B are views illustrating the data packet structure of the caption signal according to the present invention.
Figure 4B:
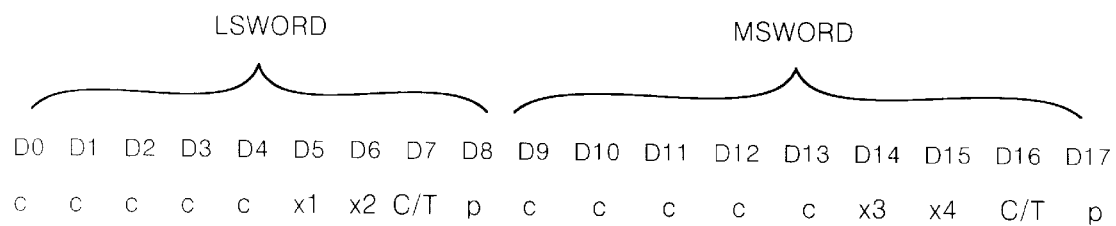

Referring to FIGS. 4A and 4B, the data packet includes three parts, that is, a parity P in the unit of a word, a caption word/additional information flag C/T, and a code value. D0 to D8 denote lower words, D9–D17 denote upper words, and D17 denotes an even parity for firstly detecting an error of transmission. D7 and D16 are caption word/additional information flags which have the value of "0" in case of the caption words, while having the value of "1" in case of the additional information. The values of D7 and D16 should necessarily coincide with each other. These flags are used for keeping the priority order of the words. D0 to D6, and D9 to D15 denote the code values. If all the code values of D5, D6, D14, and D15 are "0", the code is analyzed as a control code. Otherwise, it is analyzed as a character code.

Referring to FIG. 4A, D1, D2, D3, D9, D10, D11, and D12 of the 7-bit control code are control code data bits, and D0, D4, D8, and D13 are parity bits for the control code data bits. As shown in FIG. 5, the 3-bit code value of the lower words is for designating five functions of color designation, character attribution and roll-up, display method and roll-down, movement of position, and designation of matrix position. The 4-bit code value of the upper words of the control code designates 16 subfunctions for the respective functions as above. Here, D0 is a parity for D1, D2, D3, and D4, D4 is a parity for D1, D2, D10, and D11, and D13 is a parity for D9, D10, D11, and D12.

Also, the control code is consecutively twice transmitted for the safe reception of data, and the horizontal/vertical writing designation code and the matrix position designation code are periodically transmitted every 4 seconds. A detailed description of the control code will follow.

Referring to FIGS. 6A to 6T, the character code includes data bits of KSC 5601 code including lower words of D0 to D6 and upper words of D9 to D15. D8 is an even parity for D0 to D7.

According to the present invention, the ASCII code is not used. The 7 bits of D0 to D6 correspond to the lower byte of KSC 5601 except for the MSB, and the 7 bits of D9 to D15 correspond to the upper byte thereof except for the MSB. Among the Hangul completion type codes (KSC 5601) illustrated in FIGS. 6A to 6T, a1 and a2 lines (special character), a3 line (English), a4 line (final consonant phoneme), a5 line (Greek), aa and ab lines (Japanese Hiragana/Katakana), ac line (Russian), b0 to c8 lines (Hangul), and ca to fd lines (Chinese characters) are limitedly used. The character code is transmitted once for a character.

As described above, the Hangul caption can be transmitted using any line in a field, and thus at least one transmission line in a field is defined as a channel. The NTSC type television constructs two fields by interlaced scanning, and thus two channels may be used in captioning. Specifically, caption words composed of two languages such as for a multivoice system may be used. In this case, an odd field channel is used for the Hangul caption words, and an even field channel is used for caption words of a foreign language. The control code transmitted through each channel is the same code set, and all the character codes are included in KSC 5601.

Two kinds of information are transmitted through the channels for captioning, and the analysis and display method thereof are changed in accordance with the kinds of information. One is a caption word related to the video signal being broadcast, while the other is additional information TEXT having no relation to the contents of the broadcast signal displayed on the screen.

In the LSWord and MSWord of the data packet structure, if the values of the caption word/additional information flags are all "0", the code is analyzed as that for displaying the caption words regardless of whether the code is a control code or a character code. In this case, the words which coincide with the audio signal are displayed as a caption, covering a portion of the picture.

About 2 to 5 rows of the caption words are simultaneously used. In order to display the continuous words, the caption words should be scrolled up within a predetermined caption display region of the screen, or new caption words should be displayed on the predetermined region after the previous caption words are erased therefrom.

In transmitting the caption signal through one channel, characters of several languages may be mixed, or the Hangul characters or the characters of a foreign language are exclusively transmitted through the channel. In transmitting the caption through two channels, the channels are divided into one for the exclusive use of the Hangul and the other for the exclusive use of the foreign language.

Since it is preferable that the caption words coincide with the audio information, the caption words have priority over the additional information in occupying the channel in the unit of 2 words.

In the LSWord and MSWord of the data packet structure, if the values of the caption word/additional information flag are all "1", the code is analyzed as that for displaying the additional information regardless of whether the code is a control code or a character code. The additional information is displayed over the entire screen such as in the computer communication regardless of the contents of the broadcasting signal. At this time, the scroll function is not used.

In transmitting the additional information through two channels, it is not required to divide the additional information as the caption information. The additional information can occupy the channels any time when the caption information is not carried through the channels, but when the caption words are to be transmitted, the right of channel occupation is immediately transferred thereto. The channel can be occupied by the additional information only after the transmission of the caption words is completed.

Next, the caption display according to the horizontal writings in a television receiver will be explained.

Figure 7:
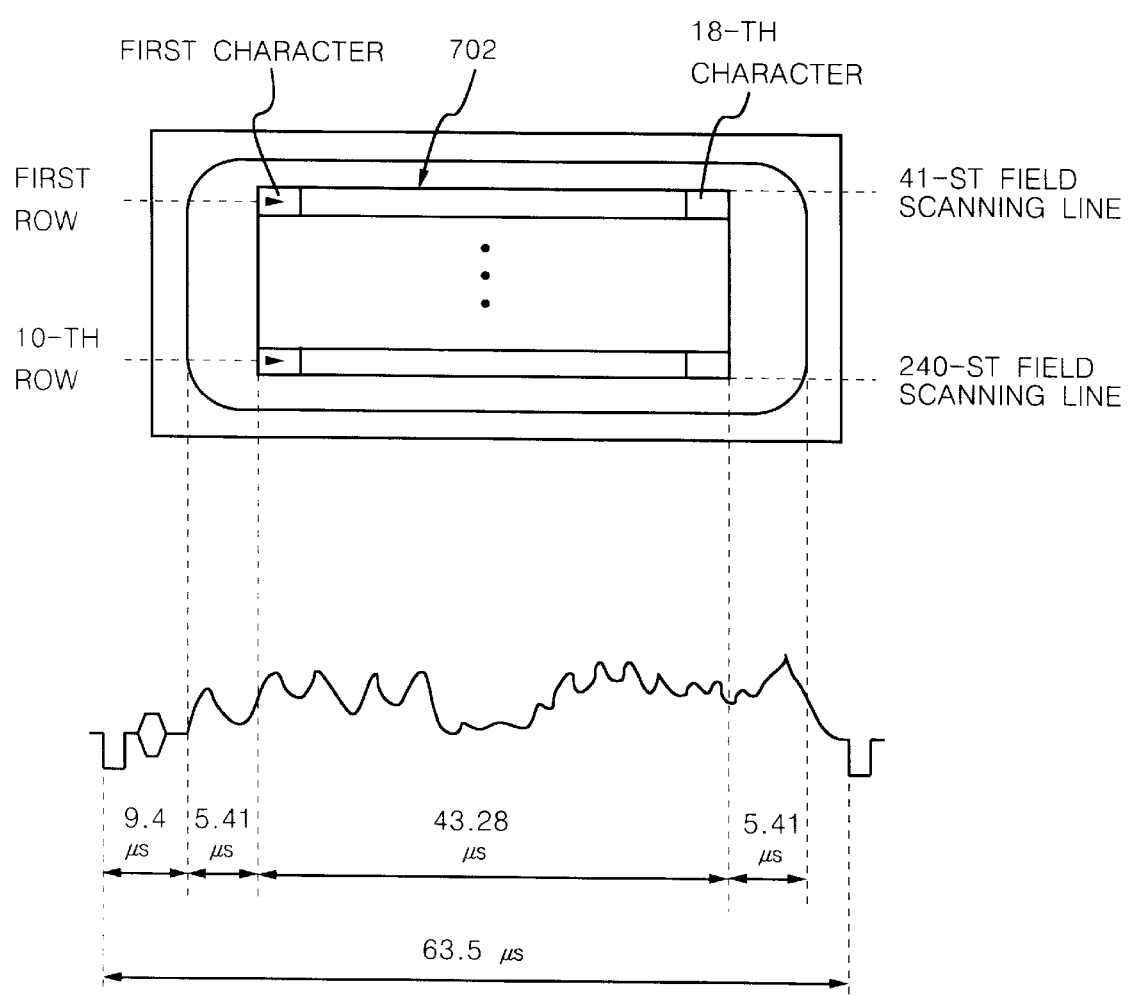
FIG. 7 is a view explaining the size of the caption region displayed on a screen according to the present invention.

Referring to FIG. 7, a caption display region 702 means a maximum screen region where caption words and additional information can be displayed. According to the NTSC type television signal in the unit of a field, the caption display region 702 corresponds to the scanning lines in the range of 41st to 240th lines, and has a height corresponding 200 scanning lines per field. Over the entire caption display region, 10 character rows are displayed. The width of the caption display region on the screen is determined to be about 80–85% of that (52.6µs) of the effective scanning lines, and thus the horizontal length of all character rows is 80–85% of the effective scanning line's width.

Since display cells of Hangul, English, and Chinese characters constitute a vertical 20-bit map, one character row including Hangul, English, and Chinese characters corresponds to 20 television scanning lines.

The maximum number of characters of Hangul and Japanese Hiragana/Katakana to be displayed in a row is determined to be 18. The width of an English character corresponds to a half of a Hangul character, and thus the maximum number of English characters to be displayed in a row is 36. The Roman alphabet, Arabian numerals, and sentence symbols are considered the same as the English alphabet.

The width of one Chinese character is the same as a Hangul character, and thus the maximum number of Chinese characters to be displayed in a row is also 18.

All the characters supported by the KSC 5601 code can be used and displayed together. If so, 18 characters at a minimum through 36 characters at a maximum can be displayed in a row.

Figure 8C:
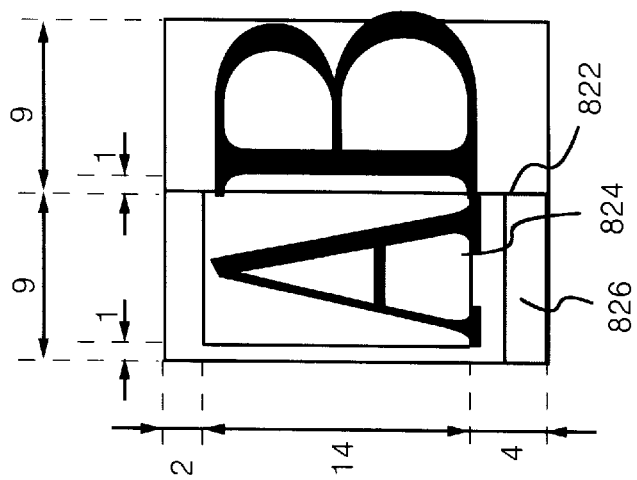
FIGS. 8A to 8C are views explaining character cells of Hangul, Chinese characters, and English, and corresponding display cells arranged for horizontal writing according to the present invention.
Figure 8B:
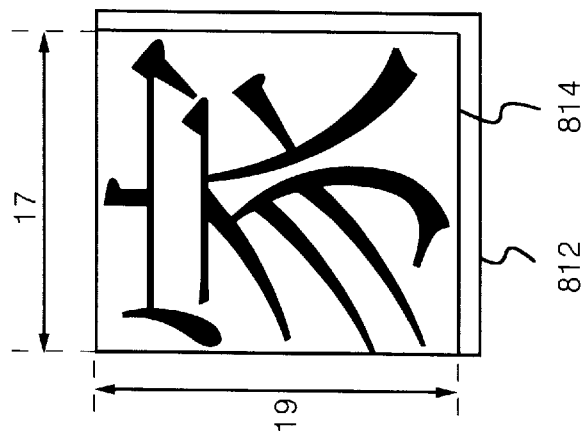
Figure 8A:
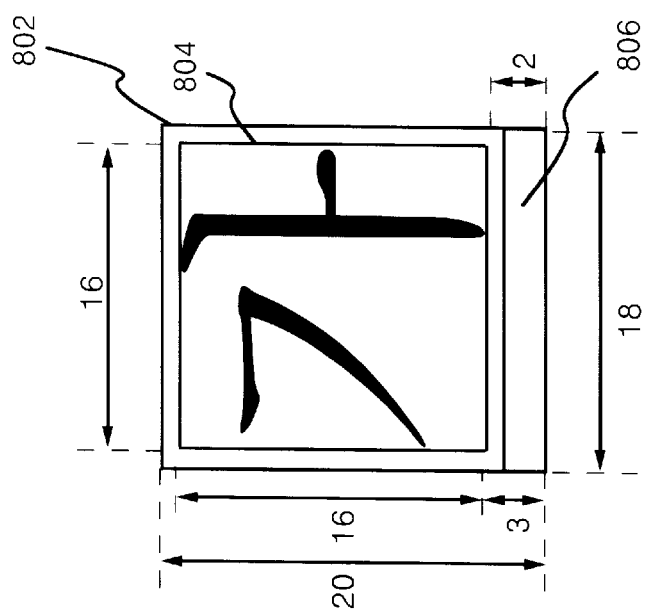

Referring to FIGS. 8A to 8C, when a character is displayed on the screen, a character cell 804, 814, or 824 represents a region occupied by a character itself without considering the space between characters, and a display cell 802, 812, or 822 represents a region occupied by a character in consideration of the space around the character.

The character cell 804 of one Hangul syllable to be displayed on the screen has a format of a 16×16 bit-map, and thus a Hangul character to be placed in the character cell is read out from a ROM which stores therein a 16×16 bit-map font.

In FIG. 8A, the display cell 802 of a Hangul syllable in consideration of the space between the characters has an 18×20 bit-map format so as to leave a space from the Hangul character cell 804 in upper, left, and right directions, respectively. In a lower direction, 2 spaces are additionally assigned to secure an underline region 806.

The caption display format of Japanese Hiragana/Katakana is the same as that of Hangul.

In FIG. 8B, the character cell 814 of a Chinese character to be displayed on the screen has a format of a 17×19 bit-map. The size of the Chinese character cell is provisionally determined, and then a different size, for example, a 16×16 size, may be determined according to the conditions of the font ROM and the internal circuit of the receiver.

The display cell 812 of a Chinese character in consideration of the space between the characters has an 18×20 bit-map format so as to leave a space from the Chinese character cell 814 in right and lower directions, respectively. Unlike Hangul or English, an underline region is not assigned to the Chinese character.

Accordingly, the width and height of the Chinese display cell 812 are the same as those of the Hangul display cell 802. As a result, the Chinese character has the same size as the Hangul character.

In FIG. 8C, the character cell 824 of an English character to be displayed on the screen has an 8×14 bit-map format.

The display cell 822 of an English character in consideration of the space between characters has a 9×20 bit-map format so as to leave 2 spaces in an upper direction, and one space in a right direction from the English character cell 824, respectively. In a lower direction, 2 spaces, in addition to the 2 spaces already mentioned, are assigned to secure an underline region 826.

Accordingly, the width of the English display cell 822 is a half of that of the Hangul display cell 802, and the height of the English display cell 822 is the same as that of the Hangul display cell 802. As a result, the size of the Hangul character is twice as large as that of the English character.

The Roman alphabet, Arabian numerals, and sentence symbols including a space character between the words are considered the same as the English alphabet.

In processing the character display within the display cell, an opaque ground process or a shadowed-edge process is performed in accordance with a control code of "ground color designation". The opaque ground may be changed to a semitransparent ground.

In the event that characters are displayed on the screen by the opaque ground process, the front portion of the first character as well as the rear portion of the last character, whose size corresponds to a Hangul syllable, may be processed as the opaque ground for convenience in reading.

Details of the control code will now be explained with reference to FIG. 5.

The control code includes two 9-bit words. Bits of D1, D2, and D3 for function classification are included in LSWord, and bits of D9, D10, D11, and D12 for selecting one of the classified functions are included in MSWord.

The control code is classified into control codes for color designation, attribute designation, display control, scrolling, cursor movement, and row/column position designation.

The color designation control code is a code for changing foreground and background colors of character data. Accordingly, if it is desired to change the foreground and background colors of the characters to be transmitted, the color designation control code is first transmitted and then the characters are transmitted. The receiver determines the foreground and background colors in accordance with the color designation control code received most recently. The foreground and background colors may be changed simultaneously or independently. The designated colors are black, red, magenta, blue, cyan, green, yellow, and white. If the background color is determined to be a transparent color, the television image can be shown on the remaining portion of the display cell except for the character portion. At this time, the characters are outline-processed with a color different from that of the characters.

The character attribute control code is a code for changing the attribute of character data. Accordingly, if it is desired to change the attribute of the characters to be transmitted, the attribute designation control code is first transmitted and then the character code is transmitted. Functions of normal display, underline, blinking, and reverse display can be designated by the attribute designation control code. Since the functions of underline, blinking, and reverse display are independently performed, all the attributes can be applied at a time.

Functions of the attribute designation control code are as follows:

▷Underline: An underline is displayed just below each character to be displayed.

▷Blinking: A displayed character is blinking. A previously displayed portion does not blink, but a presently displayed portion is blinking. The period of blinking is variably determined according to the specification of the receiver.

▷Reverse display: The colors of the foreground and background presently used in the receiver are changed from each other.

▷Normal display: All the attributes which have been designated are reset, and characters are displayed as a default attribute.

The display method control code is a control code for controlling the display mode of the characters to be transmitted. According to this code, on-display, off-display, receive/store, horizontal writing, and vertical writing can be designated.

▷On-display: The received character data is directly displayed on the screen (in a roll-up or roll-down mode), or the data stored by a control code of "receive/store" is displayed on the screen (in a pop-on mode).

▷Receive/store: The received character and control data are stored until the on-display is performed.

▷Horizontal writing: When the character codes successively received are displayed on the screen without intervention of the position movement control code, the position of a following character is moved to the right side of the presently displayed character.

▷Vertical writing: When the character codes successively received are displayed on the screen without intervention of the position movement control code, the position of a following character is moved to the lower position of the presently displayed character. The scroll control code is a code for scrolling up a predetermined portion of the caption display region, and is classified into a roll-up captioning of 2 to 5 rows and a roll-down captioning of 2 to 5 rows.

▷Roll-up of 2 to 5 rows: The 2 to 5 rows including the display position of the presently displayed character (the position of a cursor), which constitute a window, are scrolled up for one row. Among the selected rows of the window, the uppermost row disappears from the screen by scrolling, and the lowermost row is replaced by the characters decoded most recently. In using this scroll control code, a separate APDR (active position down return for the movement to the first character position of the lower row) code is not required, and all the characters outside the designated window are erased from the screen.

▷Roll-down of 2 to 5 rows: The 2 to 5 rows including the display position of the presently displayed character (the position of a cursor) are scrolled down for one row in a predetermined window. Among the selected rows of the window, the lowermost row disappears from the screen by scrolling, and the uppermost row is replaced by the characters decoded most recently. In using the scroll control code, a separate APUR (active position up return for the movement to the first character position of the upper row) code is not required, and all the characters outside the window are erased from the screen.

The position movement control code is a code for moving the display position of the character.

▷APF (active position forward): In case of the horizontal writing, the display position moves in the right direction for half the width of a Hangul character (the width of an English character). In case of the vertical writing, the display position moves in the lower direction for the height of a Hangul character.

▷APB (active position backward): In case of the horizontal writing, the display position moves in the left direction for half the width of a Hangul character (the width of an English character). In case of the vertical writing, the display position moves in the upper direction for the height of a Hangul character.

▷APDR (active position down return): In case of the horizontal writing, the display position moves to a first column position, i.e., to the very left character position of the just lower row. In case of the vertical writing, the display position moves to a first row position, i.e., to the uppermost character position of the just left column. The display position moves in the lower direction for the height of a Hangul character.

▷APUR (active position up return): In case of the horizontal writing, the display position moves to the first column position, i.e., to the very left character position of the just upper row. In case of the vertical writing, the display position moves to the first row position, i.e., to the uppermost character position of the just right column.

▷APF of 3 to 6 characters: In case of the horizontal writing, the APF is performed for the whole width of 3 to 6 English characters. In case of the vertical writing, the APF is performed for the whole height of 3 to 6 Hangul characters.

In exceptional cases of the position movement control as described above, the following processes are performed.

Specifically, if a character code is received without any control code related to position movement such as APDR, APUR, APB, roll-up of 2 to 5 rows, roll-down of 2 to 5 rows, etc., when the characters are displayed up to the right character position (the 18th column position) of the row in case of the horizontal writing, the character is displayed after the display position thereof moves to the very left character position (the first column position) of the row, without changing the row. At this time, if the received character code is a space code, it is disregarded until another character code which is not a space code is received. If a character code is received without any control code related to position movement such as APDR, APUR, PDB, roll-up of 2 to 5 rows, roll-down of 2 to 5 rows, etc., when the characters are displayed up to the very lower character position (the 10th row position) of the column in case of the vertical writing, the character is displayed after the display position thereof moves to the uppermost character position (the first row position) of the column, without changing the column. At this time, if the received character code is a space code, it is disregarded until another character code which is not a space code is received.

Transmission of a control code in accordance with a display mode is as follows:

The transmission of the control code in a pop-on mode is performed in the order of "receive/store+(another control code)+character row+(another control code)+●●●+off-display+on-display+receive/store+(another control code)+character row+(another control code)+●●●+off-display+on-display+●●●". In order for a viewer to properly view the character information displayed on the screen in the pop-on mode, a proper delay time is necessarily required before the off-display control code is transmitted from the transmission part.

The transmission of the control code in a roll-up mode is performed in the order of "on-display+(another control code)+character row+(roll-up of 2 to 5 rows)+on-display+(another control code)+character row+(another control code)+character row+(roll-up of 2 to 5 rows)+●●●". The external region of the window, which is determined every time when the control code for roll-up of 2 to 5 rows is received, should be erased with a transparent color.

The transmission of the control code in a roll-down mode is performed in the order of "on-display+(another control code)+character row+(another control code)+character row+(roll-down of 2 to 5 rows)+on-display+(another control code)+character row+(another control code)+character row+(roll-down of 2 to 5 rows)+●●●". The external region of the window, which is determined every time when the control code for roll-down of 2 to 5 rows is received, should be erased with a transparent color.

In the event that a soft scroll mode is designated during the roll-up or roll-down of the caption words, a soft scroll control code is transmitted, following the roll-up or roll-down control code.

The process of the control code in case of the vertical writing is as follows:

If a control code for vertical writing is decoded in the receiver, the display of the Hangul characters is changed to a column direction.

The vertical writing is mainly used in the event that a caption already exists in the broadcasting signal. The structure of the character cell in the vertical writing is not required to be the same as the character cells of the respective characters.

Figure 9C:
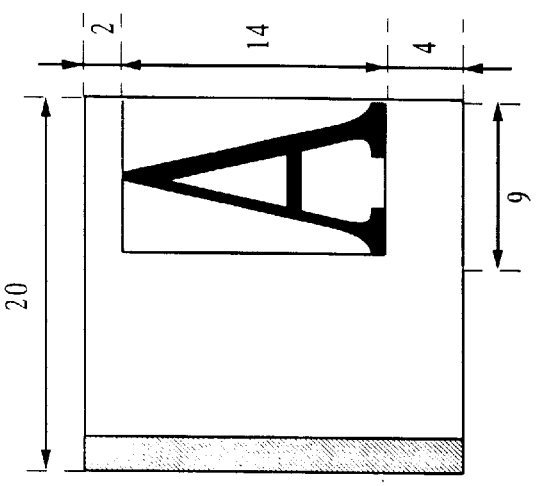
FIGS. 9A to 9C are views explaining character cells of Hangul, Chinese characters, and English, and corresponding display cells arranged for vertical writing according to the present invention.
Figure 9B:
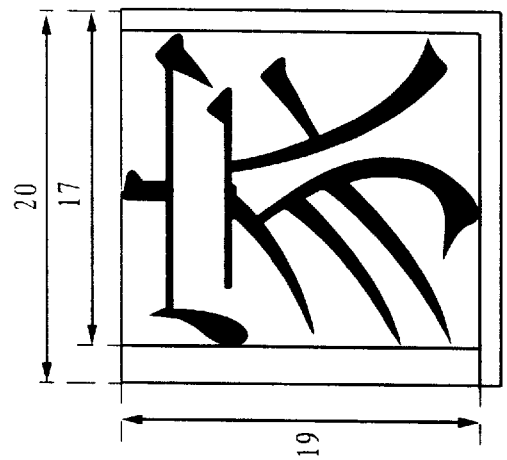
Figure 9A:
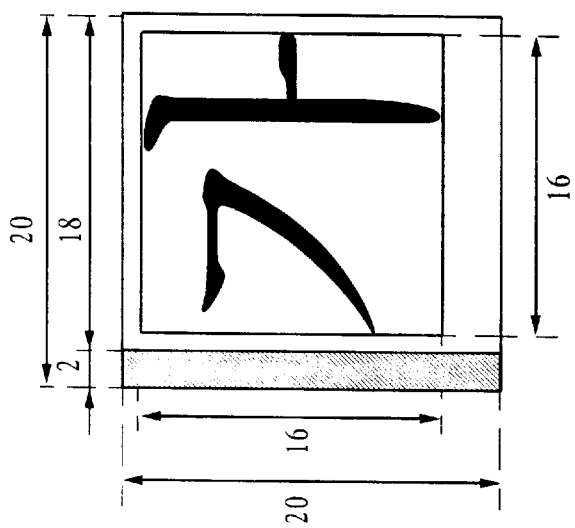

Referring to FIGS. 9A through 9C, in case of the vertical writing, the display cell's sizes of all kinds of characters coincide with one another regardless of the character cell's sizes of the respective characters. For example, the entire region occupied by an English character on the screen should coincide with that occupied by a Hangul character in consideration of the space between the characters in case of the vertical writing. In displaying the English character by the vertical writing, since the width of the English character cell corresponds to half the width of the Hangul character when font data is used in the vertical writing, the position of the English character cell of the corresponding display cell is determined to be included in a right half of the Hangul character cell as shown in FIG. 9C. In case of the vertical writing, since the underline designated by the underline designation is displayed on the right side of the character cell, the structure of the display cell will be different from that in case of the vertical writing, which may be determined in a different way in accordance with the view of the receiver. However, the display cell in case of the vertical writing should have enough size to include any of the character cells of all the characters.

In case of the vertical writing, it is comfortable to view the caption words when the column space is wider than the row space, and thus it is preferable that the structure of the character matrix in the caption display region is reconstructed. Specifically, in order to widen the column space in case of the vertical writing, the number of columns to be displayed is determined to be 16, and the number of characters to be displayed in a column is determined to be 10. Since all the characters have a character cell of the same size in case of the vertical writing, a 10×16 (row×column) character matrix is displayed over the entire screen. The caption region has the same width as that in case of the horizontal writing, and has a height smaller than or equal to that in case of the horizontal writing. Accordingly, the column space in the vertical writing is smaller than or equal to that in the horizontal writing, providing convenience in vertical reading. The column spaces should be identical to one another.

The default position of the receiver, when a specific position control code is not received in case of the vertical writing, is determined to be the first character position of the 16th column.

The direction of the active position of the cursor movement control code such as APDR, APUR, APF, APB, and N-APF in case of the vertical writing is determined based on the vertical column which corresponds to the character display direction. Specifically, it is defined such as down=left direction, up=right direction, forward=lower direction, and backward=upper direction. The APDR is defined as a control code for moving the display position to the position of the upper most character (a first row position) of the just left column, and the APUR is defined as a control code for moving the display position to the position of the uppermost character (a first row position) of the just right column.

In case of the vertical writing, the control code for roll-up of 2 to 5 columns is a code for displaying the contents of a window with scrolling of the same for one column in the right direction within the window including the right side columns of 2 to 5 including the present character display position (the position of the cursor). In operation, the very right column among the selected columns of the window disappears from the screen by scrolling, and the very left column is replaced by the character column decoded most recently. In using this control code, a separate APDR code for moving the display position to the uppermost character position of the left column in case of the vertical writing is not required, and all the regions outside the window of 2 to 5 columns are erased from the screen with a transparent color.

The control code for roll-down of 2 to 5 columns is a code for displaying the contents of a window with scrolling of the same for one column in the left direction within the window including the left side columns of 2 to 5 including the present character display position (the position of the cursor). In operation, the very left column among the selected columns of the window disappears from the screen by scrolling, and the very right column is replaced by the character column decoded most recently. In using this control code, a separate APUR code for moving the display position to the uppermost character position of the right column in case of the vertical writing is not required, and all the regions outside the window including 2 to 5 columns are erased from the screen with a transparent color.

Details of the control code for additional information will now be explained.

The additional information control code is transmitted in the unit of a page, and classified into a 'page start' control code and a 'page end' control code for page process. The 'page start' corresponds to 2-row roll-up of the caption words, and the 'page end' corresponds to 2-row roll-down of the caption words.

▷Page start: This represents the start of one page of the additional information, and the receiver starts to store the corresponding page when the page start control code is received. If the page start control code is not received at the start of a page, all data of this page will be disregarded.

▷Page end: This represents the end of one page of the additional information, and the receiver displays on the screen the data of the received page when the page end control code is received.

When the row change of the additional information is required, one code among the APDR, APUR, and column position designation control codes should be necessarily transmitted.

Before a page of the additional information data is displayed on the screen, the picture should be erased by a ground color of the page to be displayed, and thus the ground color is required to be transmitted for a page. The ground color code coming just after the 'page start' code identifies the ground color of the page, but if the ground color code does not come just after the 'page start' code, the ground color of the previous page is determined as the ground color of the present page.

The vertical writing is used just in the event that caption words for information such as news have already been displayed on the lower portion of the screen, and thus it is usually disregarded. Also, the roll-up of 3 to 5 rows and the roll-down of 3 to 5 rows are disregarded.

Discrimination and process of an effective code will be performed.

The receiver decodes the caption signal, discriminates and processes an effective code in the following order:

1) An input code is discriminated as the effective code only when D7 and D6 are the same.
2) Whether or not D17 is the same as D0⊕D1⊕D2⊕D3⊕D4⊕D5⊕D6⊕D7⊕D8⊕D9⊕D10⊕D11⊕D12⊕D13⊕D14⊕D15⊕D16 is checked, and if so, the input code is determined as the effective code.
3) If D5 and D6 are (0,1), and D14 and D15 are (0,0), the input code is determined as a control code. If D5 and D6 are (0,1), (1,0), or (1,1), and D14 and D15 are (0,1),(1,0) or (1,1), the input code is determined as a character code. If one pair of D5, D6, and D14, D15 are (0,0), and the other pair are (0,1), (1,0), or (1,1), the input code is determined as an error since it is not possible that the control code and the character code are simultaneously received.
4) If the input code is discriminated as the character code at step 3), it is checked whether or not D8 is the same as D0⊕D1⊕D2⊕D3⊕D4⊕D5⊕D6⊕D7. If so, it is determined that the discriminated code is an error.

5) If it is determined that the discriminated character code is not an error at step 4), it is identified whether or not the character code is defined by KSC 5601. If not, '?' or '▌' is displayed, while if so, the corresponding character is displayed on the screen.

6) If the input code is discriminated as a control code at step 3), it is checked whether or not D0 is the same as D1⊕D2⊕D3⊕D9, and whether or not D4 is the same as D1⊕D2⊕D11⊕D12 in the LSWord. If it is checked that either of them is not the same, the control code is determined as an error.

7) If it is determined that the discriminated code is not an error at step 6), it is identified whether or not the control code is defined in the control code table of FIG. 5. If not, the control code is determined as an error, while if so, repeated transmission of the same LSWord and MSWord is waited for. 8) If the same LSWord and MSWord are repeatedly transmitted, application of the control code is performed.

The effective code discrimination and process as described above represents the preferred embodiment of the present invention, and any modification thereof will be possible. For example, the combination of the parity of the control code may be differently determined. Especially, various methods for preventing the error of the control code may be implemented.

The effect of the present invention as described above will now be explained in detail.

By the combination of the above-described control codes, the captioning has three modes available, including scroll of caption words, pop-on of caption words, and display of additional information.

If the roll-up and roll-down control codes are combined in the horizontal and vertical writings, the caption scroll is produced in four directions of upper, lower, left, and right sides.

Here, the caption roll display in the upper direction in case of the horizontal writing will be explained, while the movement in the lower direction will be omitted. A successive transmission code line includes "black ground-black ground-white character-white character-horizontal writing-horizontal writing-10th row-10th row-2nd column-2nd column-on-display-on-display-"da"-"um"-"un"-space-R-o-l-l-"pyo"-"shi"-"bup"-"eui"-space-"de"-"ei"-"ta"-space-"jun"-"song"-"ae"-". Here and hereafter, each character or wording in quotation marks represents transliteration of one Hangul character or wording. Accordingly, as shown in FIG. 10, white characters are displayed on a black ground of the screen. Thereafter, if another successive transmission code line of "2-row roll-up-2-row roll-up-"dae"-"han"-space-"ye"-"rul"-space-"bo"-"in"-space-"gut"-"ei"-"da"-. " follows, one character row is rolled up on the screen as shown in FIG. 11. In the same manner, if another successive transmission code line of "2-row roll-up-2-row roll-up-"to"-space-"han"-space-"jul"-"eul"-space-R-o-l-l-u-p-space-"shi"-"kin"-"da"-." follows, the character line of the 9th row is erased, and the remaining rows are scrolled up for one row as shown in FIG. 12.

Meanwhile, the caption roll display in the left direction in case of the vertical writing will be explained, while the caption roll display in the right direction will be omitted. A successive transmission code line includes "off-display-off-display-black ground-black ground-white character-white character-vertical writing-vertical writing-2nd row-2nd row-15th column-15th column-on-display-on-display-"ei"-"bun"-ae"-"nun"-space-"se"-"ro"-"seu"-"gi"-APDR-APDR-R-o-l-l-"pyo"-gi-"eui"-space-"ye"". Accordingly, as shown in FIG. 13, white characters are vertically displayed on a black ground of the screen. Thereafter, if another successive transmission code line of "2-column roll-up-2-column roll-up-APDR-APDR-"rul"-space-"bo"-"in"-space-"gut"-"ei"-"da"-." follows, one character column is scrolled in the left direction of the screen as shown in FIG. 14.

Referring to FIGS. 15 to 17, the soft scroll function according to the present invention corresponds to the roll-up of the caption words line by line.

Specifically, if a viewer selects a soft scroll function by the remote controller while the 2-line roll-up of the caption words is performed as shown in FIG. 15, the caption processing section 230 reads out from the display memory the character data line by line, not row by row. Accordingly, the displayed caption words are rolled up by lines into which the roll-up time for a row is divided by 20, resulting in that the displayed caption words appear to be scrolled softly as shown in FIGS. 15 to 17.

In addition, the caption processing section 230 may read out from the display memory the character data line by line such that displayed caption words are rolled up by lines into which the roll-up time for a column is divided by a predetermined number, resulting in that the displayed caption words appear to be scrolled softly in a horizontal direction.

The broadcasting system is made in such a manner that symbol lines are properly arranged so that a control code for the display position is transmitted every 4 seconds since the control code is not identified when the receiver starts to operate. If the accurate position and the operating mode are not identified after the receiver operates, a normalized receiver displays the received character code on a default position. Thereafter, if a control code which is transmitted every 4 seconds is received, the receiver erases the presently displayed caption words, and then performs a caption display in accordance with a new control code.

The receiver displays the received character code on the default position of each mode if the accurate position and the operation mode are not identified. Thereafter, if the horizontal/vertical writing designation code and the row/column position designation code are received, the receiver erases the previously displayed caption words and performs a caption display operation according to the new control code.

If the user changes the television channel while using the caption words and additional information, the captioning is released and only the television picture is displayed on the screen even though a caption signal is transmitted through the changed television channel.

In the event that a specific control code is not received at a point when the user selects the caption, the receiver maintains the attribute-release state, and immediately displays by the horizontal writing white characters on a black ground, starting from the first column position of the 10th row in the caption display region.

As described above, according to the present invention, the displayed caption words are not scrolled row by row, but are scrolled line by line during the roll-up or roll-down of the closed-caption, and thus the scrolling of the caption words on the screen appears soft and natural.

While the present invention has been described and illustrated herein with reference to the preferred embodiments thereof, it will be understood by those skilled in the art that various changes in form and details may be made therein without departing from the spirit and scope of the invention.

What is claimed is:

1. A soft scrolling method of closed-caption words whereby caption information encoded in a horizontal line of a field of a television broadcasting signal, which does not affect the broadcasting signal, is displayed on a display screen of a receiver by selection of a viewer, the soft scrolling method comprising the steps of:

discriminating whether a present mode is a soft scroll mode;

reading out character data for one line or for several lines from a display memory in which decoded caption information is stored at predetermined intervals into which a one-row scrolling time is equally divided if said present mode is discriminated as said soft scroll mode; and converting said read-out character data into a video signal to display said video signal on said display screen.

2. A soft scrolling method as claimed in claim 1, wherein said soft scroll mode is designated by the viewer.

3. A soft scrolling method as claimed in claim 1, wherein said soft scroll mode is designated by a soft scroll control code transmitted from a broadcasting station.

4. A soft scrolling method as claimed in claim 1, wherein said predetermined interval corresponds to lines whose number is determined within the range of 2 to 20.

5. A soft scrolling method as claimed in claim 1, wherein said predetermined interval corresponds to one line.

6. A broadcasting system for generating a television signal by encoding a caption signal in a video signal, comprising:

a transmitter including a video processor to process the video signal, a caption encoder for generating and encoding the caption signal into the video signal, said caption encoder including a synchronous counter to receive sync signals from said video processor, counts a horizontal sync signal to select predetermined scanning lines of the video signal, and is reset by a vertical sync signal; and a switching unit to alternately output the video signal and the caption signal based upon the counted value to superimpose the caption signal in specific lines of the video signal, to generate the television signal; and a transmission unit to transmit the television signal; and a receiver to receive the television signal, said receiver including a video signal processing unit to luminance and chrominance process the television signal received from said transmission unit, a data extractor to convert the television signal received from said transmission unit into a digital signal, a sync separator to separate vertical and horizontal sync signals from the television signal received from said transmission unit, a command input section to receive command inputs from a user, one command being a soft scroll command, a storage device to store character information of a bit-map type, and a caption processing unit to extract the caption signal from the digital signal based upon the output from said sync separator and, in response, to read out the character information from the storage device corresponding to at least one line, and less than a total number of lines which form a row of character text, at predetermined intervals into which a one row scrolling time is equally divided in response to the soft scroll command.

7. A broadcasting system as claimed in claim 6, wherein said caption encoder further comprises:

a character information unit to receive character data and, in response, generate caption character data in a plural byte format;

a character code generator which uses a most significant bit of each byte of the caption character data as a flag indicative as to whether the character data is caption word data related to the video signal being broadcast or additional information having no relation to the video signal being broadcast, said character code generator replacing each most significant bit with a first value if the character data is the caption word data and replacing each most significant bit with a second value different from the first value if the character data is the additional data, and adding a parity bit to each byte, to generate a first data packet as a character code;

a control information input unit to receive control information for caption control and generates caption control data in a plural bit format;

a control code generating section to divide the plural bits of the caption control data into an upper plural number of bits and a lower plural number of bits, to create an upper byte by adding a first parity bit, control code discriminating bits, and the flag to the upper plural number of bits, to create a lower byte by adding second and third parity bits, control code discriminating bits and the flag to the lower plural number of bits, and to add additional respective parity bits to each of said upper and lower bytes, to generate a second data packet as a control code; and a modulating section to modulate the character and control codes by digital modulation, to generate the caption signal.

8. A broadcasting system as claimed in claim 7, wherein said caption processing unit extracts the caption signal from the digital signal based upon the output from said sync separator, discriminates the caption signal as being one of the character code and control code based on designated values of selected bits of the character code and control code, reads out the character information from the storage device corresponding to at least one line, and less than a total number of lines which form a row of character text, at predetermined intervals into which a one row scrolling time is equally divided in response to the soft scroll command and the discrimination of the character code, to alter an appearance of a caption on a display based upon the discrimination of the control code.

9. A broadcasting system as claimed in claim 8, wherein each of the character code and the control code includes a parity in a unit of a word, the flag, and a code value, wherein values of particular bits of each of the character code and the control code are indicative as to whether a particular data packet is the character code or the control code.

10. A broadcasting system as claimed in claim 8, wherein said command input section generates one of a display of reception or non-reception of the caption signal in a field of the television signal, display of a receiving sensitivity of the caption signal, display of existence or nonexistence of two different languages within the caption signal, display of reception or non-reception of the additional information, on/off function of caption words within the caption signal, on/off function of the additional information, a holding function of caption words within the caption signal of two different languages, a prevention function of vertical writing of the character data, and a soft scrolling function control such that the character information is read out from the storage device corresponding to at least one line, and less than a total number of lines which form a row of character text, at predetermined intervals into which a one row scrolling time is equally divided.

11. A broadcasting system as claimed in claim 8, wherein ones of the lower plural number of bits designate a plurality of functions for displaying the character information, and ones of the upper plural number of bits designate a plurality of subfunctions for the functions for displaying the character information.

12. A receiver to receive a television signal including a video signal encoded with a caption signal, comprising:
   a receptor for receiving the television signal;
   a video signal processing unit to luminance and chrominance process the television signal;
   a data extractor to convert the television signal into a digital signal;
   a sync separator to separate vertical and horizontal sync signals from the television signal;
   a command input section to receive command inputs from a user, one command being a soft scroll command;
   a storage device to store character information of a bit-map type; and
   a caption processing unit to extract the caption signal from the digital signal based upon the output from said sync separator, to discriminate the caption signal as being one of a character code containing caption character data and a control code for controlling display of the caption character data based on designated values of selected bits of the character code and control code, to read out the character information from the storage device corresponding to at least one line, and less than a total number of lines which form a row of character text, at predetermined intervals into which a one row scrolling time is equally divided in response to the soft scroll command and the discrimination of the character code, to alter an appearance of a caption on a display based upon the discrimination of the control code.

13. A receiver as claimed in claim 12, wherein each of the character code and the control code includes a parity in a unit of a word, a flag, and a code value, wherein values of particular bits of each of the character code and the control code are indicative as to whether a particular data packet is the character code or the control code.

14. A receiver as claimed in claim 12, wherein said command input section generates one of a display of reception or non-reception of the caption signal in a field of the television signal, display of a receiving sensitivity of the caption signal, display of existence or nonexistence of two different languages within the caption signal, display of reception or non-reception of the additional information, on/off function of caption words within the caption signal, on/off function of the additional information, a holding function of caption words within the caption signal of two different languages, a prevention function of vertical writing of the character data, and a soft scrolling function control such that the character information is read out from the storage device corresponding to the at least one line, and less than the total number of lines which form the row of character text, at the predetermined intervals into which the one row scrolling time is equally divided.

15. A receiver as claimed in claim 12, wherein ones of a lower plural number of bits of the control code designate a plurality of functions for displaying the character information, and ones of an upper plural number of bits of the control code designate a plurality of subfunctions for the functions for displaying the character information.

16. A receiver as claimed in claim 14, wherein ones of a lower plural number of bits of the control code designate a plurality of functions for displaying the character data, and ones of an upper plural number of bits of the control code designate a plurality of subfunctions for the functions for displaying the character data.

17. A receiver as claimed in claim 12, wherein an odd field channel of the video signal is used to transmit the character data of a first language and an even field channel of the video signal is used to transmit the character data of a second language different from the first language.

18. A receiver as claimed in claim 17, wherein the character code is transmitted through both the odd and even field channels of the video signal.

19. A receiver to receive a television signal including a video signal encoded with a caption signal from a transmission unit, comprising:
   a receptor for receiving the television signal;
   a video signal processing unit to luminance and chrominance process the television signal received from said transmission unit,
   a data extractor to convert the television signal received from said transmission unit into a digital signal,
   a sync separator to separate vertical and horizontal sync signals from the television signal received from said transmission unit,
   a storage device to store character information of a bit-map type,
   a caption processing unit to extract the caption signal from the digital signal based upon the output from said sync separator, to discriminate the caption signal as being one of a character code containing caption character data and a control code for controlling display of the caption character data based on designated values of selected bits of the character code and control code, to read out the character information from the storage device corresponding to at least one line, and less than a total number of lines which form a row of character text, at predetermined intervals into which a one row scrolling time is equally divided in response to the soft scroll command and the discrimination of the character code, to alter an appearance of a caption on a display based upon the discrimination of the control code, and
   a mixer to mix the luminance and chrominance processed television signal with the output of said caption processing unit.

20. A receiver as claimed in claim 19, wherein each of the character code and the control code includes a parity in a unit of a word, a flag, and a code value, wherein values of particular bits of each of the character code and the control code are indicative as to whether a particular data packet is the character code or the control code.

21. A receiver as claimed in claim 19, wherein said caption processing unit generates one of a display of reception or non-reception of the caption signal in a field of the television signal, display of a receiving sensitivity of the caption signal, display of existence or nonexistence of two different languages within the caption signal, display of reception or non-reception of the additional information, on/off function of caption words within the caption signal, on/off function of the additional information, a holding function of caption words within the caption signal of two different languages, a prevention function of vertical writing of the character data, and a soft scrolling function control such that the character information is read out from the storage device corresponding to the at least one line, and less than the total number of lines which form the row of character text, at the predetermined intervals into which the one row scrolling time is equally divided.

22. A receiver as claimed in claim 19, wherein ones of a lower plural number of bits of the control code designate a plurality of functions for displaying the character information, and ones of an upper plural number of bits of the control code designate a plurality of subfunctions for the functions for displaying the character information.

23. A receiver as claimed in claim 21, wherein ones of a lower plural number of bits of the control code designate a plurality of functions for displaying the character information, and ones of an upper plural number of bits of the control code designate a plurality of subfunctions for the functions for displaying the character information.

24. A receiver as claimed in claim 19, wherein an odd field channel of the video signal is used to transmit the character data of a first language and an even field channel of the video signal is used to transmit the character data of a second language different from the first language.

25. A receiver as claimed in claim 24, wherein the character code is transmitted through both the odd and even field channels of the video signal.

26. A soft scrolling method of closed-caption word, wherein caption information is encoded in horizontal lines of fields of a television signal and is displayed on a display screen of a receiver based upon viewer commands, the soft scrolling method comprising the steps of:

(a) pre-storing a plurality of lines of character data, wherein a plural number of the plurality of lines form each row of closed-caption words;

(b) reading out at least one line of the character data, less than the plural number of lines, for display on the display screen; and (c) repeating step (b) for subsequent lines of the character data so that the closed-caption words smoothly scroll on the display screen.

27. A soft scrolling method as claimed in claim 26, wherein an odd field channel of the video signal is used to transmit the character data of a first language and an even field channel of the video signal is used to transmit the character data of a second language different from the first language, so that caption words of the first and second languages smoothly scroll on the display screen.

28. A soft scrolling method of closed-caption words whereby caption information encoded in a horizontal line of a field of a television broadcasting signal, which does not affect the broadcasting signal, is displayed on a display screen of a receiver by selection of a viewer, the soft scrolling method comprising the steps of:

discriminating whether a present mode is a soft scroll mode;

reading out character data for one line or for several lines from a display memory in which decoded caption information is stored at predetermined intervals into which a one-column scrolling time is equally divided if said present mode is discriminated as said soft scroll mode; and converting said read-out character data into a video signal to display said video signal on said display screen.

29. A receiver to receive a television signal including a video signal encoded with a caption signal, comprising:

a receptor for receiving the television signal;

a video signal processing unit to luminance and chrominance process the television signal;

a data extractor to convert the television signal into a digital signal;

a sync separator to separate vertical and horizontal sync signals from the television signal;

a command input section to receive command inputs from a user, one command being a soft scroll command;

a storage device to store character information of a bit-map type; and a caption processing unit to extract the caption signal from the digital signal based upon the output from said sync separator, to discriminate the caption signal as being one of a character code containing caption character data and a control code for controlling display of the caption character data based on designated values of selected bits of the character code and control code, to read out the character information from the storage device corresponding to at least one line, and less than a total number of lines which form a column of character text, at predetermined intervals into which a one column scrolling time is equally divided in response to the soft scroll command and the discrimination of the character code, to alter an appearance of a caption on a display based upon the discrimination of the control code.

* * * * *